United States Patent
Nason et al.

(10) Patent No.: US 8,370,646 B2
(45) Date of Patent: Feb. 5, 2013

(54) METHOD AND SYSTEM FOR MAINTAINING SECURE DATA INPUT AND OUTPUT

(75) Inventors: D. David Nason, Bainbridge Island, WA (US); Carson Kaan, Seattle, WA (US); John E. Easton, Everett, WA (US); Jason M. Smith, Redmond, WA (US); John A. Painter, Everett, WA (US); William J. Heaton, Everett, WA (US)

(73) Assignee: xSides Corporation, Bellevue, WA (US)

( * ) Notice: Subject to any disclaimer, the term of this patent is extended or adjusted under 35 U.S.C. 154(b) by 291 days.

(21) Appl. No.: 12/567,385

(22) Filed: Sep. 25, 2009

(65) Prior Publication Data

US 2010/0077231 A1    Mar. 25, 2010

Related U.S. Application Data

(60) Continuation of application No. 10/992,166, filed on Nov. 18, 2004, now abandoned, which is a division of application No. 10/167,053, filed on Jun. 10, 2002, now Pat. No. 7,007,025.

(60) Provisional application No. 60/297,273, filed on Jun. 8, 2001.

(51) Int. Cl.
*G06F 12/14* (2006.01)

(52) U.S. Cl. .................................................. 713/193
(58) Field of Classification Search .................... 713/193
See application file for complete search history.

(56) References Cited

U.S. PATENT DOCUMENTS

| | | | |
|---|---|---|---|
| 4,290,105 A | 9/1981 | Cichelli et al. | |
| 5,027,400 A | 6/1991 | Baji et al. | |
| 5,381,347 A | 1/1995 | Gery | |
| 5,583,561 A | 12/1996 | Baker et al. | |
| 5,646,651 A | 7/1997 | Spannaus et al. | |
| 5,715,515 A | 2/1998 | Akins, III et al. | |
| 5,731,811 A | 3/1998 | De Lange et al. | |

(Continued)

FOREIGN PATENT DOCUMENTS

| EP | 1 022 639 A2 | 7/2000 |
|---|---|---|
| WO | WO 96/20567 | 7/1996 |

(Continued)

OTHER PUBLICATIONS

"Special Edition Using Windows NT 4.0 Server" (C)1996 Que Publishing Inc. http://docs.rinet.ru/NTServak/glossary.htm.*

(Continued)

*Primary Examiner* — Kambiz Zand
*Assistant Examiner* — Thomas Gyorfi
(74) *Attorney, Agent, or Firm* — Michael J. Donohue; Davis Wright Tremaine LLP

(57) ABSTRACT

Methods and systems for enhancing the security of data during input and output on a client computer system are provided to prevent attempts by unauthorized code to access, intercept, and/or modify data. Example embodiments provide a plurality of obfuscation techniques and security enhanced drivers that use these obfuscation techniques to prohibit unauthorized viewing/receiving of valid data. When the drivers are used together with the various obfuscation techniques, the security enhanced drivers provide mechanisms for "scheduling" the content of the storage areas used to store the data so that valid data is not available to unauthorized recipients. When unauthorized recipients attempt to access the "data," they perceive or receive obfuscated data. The obfuscation techniques described include "copy-in," "replace and restore," and "in-place replacement" de-obfuscation/re-obfuscation techniques. In one embodiment, a security enhanced display driver, a security enhanced mouse driver, a security enhanced keyboard driver, and a security enhanced audio driver are provided. To complement the security enhancements, the methods and systems also provide for a watchdog mechanism to ensure that the driver is functioning as it should be and various user interface techniques for denoting security on a display device.

9 Claims, 25 Drawing Sheets

U.S. PATENT DOCUMENTS

| | | | |
|---|---|---|---|
| 5,825,879 | A | 10/1998 | Davis |
| 5,881,287 | A | 3/1999 | Mast |
| 5,936,616 | A | 8/1999 | Torborg, Jr. et al. |
| 5,961,617 | A | 10/1999 | Tsang |
| 6,064,739 | A | 5/2000 | Davis |
| 6,118,870 | A * | 9/2000 | Boyle et al. ............ 380/201 |
| 6,149,522 | A | 11/2000 | Alcorn et al. |
| 6,151,659 | A | 11/2000 | Solomon et al. |
| 6,209,103 | B1 | 3/2001 | Schreiber et al. |
| 6,298,446 | B1 | 10/2001 | Schreiber et al. |
| 6,353,892 | B2 | 3/2002 | Schreiber et al. |
| 2001/0016829 | A1 | 8/2001 | Toshikage et al. |
| 2002/0057893 | A1 | 5/2002 | Wood et al. |
| 2004/0049637 | A1 | 3/2004 | Morikawa |

FOREIGN PATENT DOCUMENTS

| | | |
|---|---|---|
| WO | WO 99/47990 | 9/1999 |

OTHER PUBLICATIONS

McFedries, Paul. "Windows® 98 Unleashed" © 1998 Sams Publishing Inc. excerpt from Chapter 25 (3 pages).*

"Definition: device driver" Originally published Oct. 27, 1994 http://dict.die.net/device%20driver.*

Savil, John. "How can I enable Windows Media Player (WMP) to play DVDs?" Published Oct. 30, 2000 (2 pages) http://www.windowsitpro.com/article/video/how-can-i-enable-windows-media-player-wmp-to-play-dvds.*

"Windows Media Player 7 and Print Screen?—Ars Technica OpenForum" Posts between Nov. 25, 2000 and Nov. 28, 2000 (4 pages) http://arstechnica.com/civis/viewtopic.php?f=15&t=1045438.*

* cited by examiner

Case 1: Overwrite invalid data on copy-out

Case 2: Create valid data on copy-out

Case 3: Replace and Restore

Case 4: Replace and Restore—no stored valid data outside secure portion in FB

Case 5: In-place Replacement

METHOD AND SYSTEM FOR MAINTAINING SECURE DATA INPUT AND OUTPUT

CROSS-REFERENCE TO RELATED APPLICATIONS

This application is a continuation of U.S. patent application Ser. No. 10/992,166 filed Nov. 18, 2004, which is a divisonal of Ser. No. 10/167,053 filed Jun. 10, 2002 which claimed the benefit of U.S. Provisional Application No. 60/297,273, filed on Jun. 8, 2001.

BACKGROUND OF THE INVENTION

1. Field of the Invention

The present invention relates to methods and systems for maintaining the security of data in a computer-based environment and in particular, to methods and systems for maintaining the security of data as it is input from an input device such as a mouse or keyboard and as it is output through, for example, audio or video means.

2. Background Information

The concept of security continues to become increasingly more important in a world where personal computer systems are generally connected via wireless or wired networks and/or internetworks, such as the Internet, to other computing systems. Many companies and institutions have addressed security issues as they relate to, for example, the transfer of data from a personal (client) computer system to server computer systems over network communications. For example, firewalls are typically present on local area networks (LANs) to form boundaries between the rest of the internetworking world and the computer systems on the LAN. In addition, widely used cryptography techniques are often applied to such data transfers to ensure the security of the data communication paths.

However, there still remains a problem on the client computer systems themselves regarding valuable data that is often stored in valid form on the client computer system even though it may be transmitted in encrypted form over a communications channel to a server machine. For example, a user desiring to buy an object over the Internet, may connect and log into a website and provide his/her credit card information in order to purchase the object. Although the website (and client browser on the client machine) may support the transfer of the credit card information using a secure communications layer (such as SSL—secure socket layer protocol), the credit card information, in order to be displayed on the display device of the client computer system actually resides in storage as valid data for some period of time. Unauthorized "hackers" can then access such stored data (providing they are not kept out by a firewall or have been installed as rogue applications on the client computer system) using sophisticated mechanisms, even if the data is stored briefly. Thus, there is an ever-increasing need for providing techniques for securing data on a client machine.

BRIEF SUMMARY OF THE INVENTION

Embodiments of the present invention provide computer-based methods and systems for enhancing the security of data during input and output on a client computer system in order to prohibit and/or frustrate attempts by illegitimate processes, applications, or machines to obtain data in an unauthorized fashion. For the purposes of this description, "data" includes digital bits or analog signals in a computer system transferred or stored for any purpose, including graphics, text, audio, video, input signals, output signals, etc. Example embodiments provide a plurality of obfuscation techniques and security enhanced, system level drivers that use these obfuscation techniques to prohibit unauthorized receivers/viewers of the data from receiving/viewing valid data. When these obfuscation techniques are used with the security enhanced drivers, the drivers can ensure that invalid data is always received/viewed by unauthorized recipients/viewers, thus preventing unauthorized hackers with access to valid data. Several obfuscation techniques by themselves offer varying levels of security.

For the purposes of this description, the term "obfuscation" refers to any mechanism or technique for transforming or hiding valid data so that the valid data becomes difficult to view, intercept, process, or modify without proper authorization and thus, appears as invalid data when accessed in an unauthorized manner. Obfuscation techniques may be implemented as software, hardware, or firmware, depending upon the execution environment of interest.

In some embodiments, the obfuscated data comprises, for example, an opaque color such as all black or all white, a pattern, a random bitmap, noise, masked data, an image, a company logo, or an advertisement. Other types of obfuscation, depending upon the type of data, are also possible.

For secure display of data on a display device and other types of display storage, the obfuscation techniques include "copy-out", "replace and restore," and "in-place replacement." These techniques specify where (and how) obfuscated data is de-obfuscated to generate valid data for display and where (and how) data is re-obfuscated. Some techniques utilize an overlay buffer or a mask buffer in conjunction with a frame buffer to accomplish the obfuscation process. Others take advantage of any standard raster operation or overlay operation logic already present on a video card. In other embodiments, the obfuscation techniques are applied to the scheduling of content in other types of storage.

In some embodiments, the security enhanced drivers (SEDs) implement varying degrees and levels of security, from making the data present with garbled information or noise, to encrypted data. The SEDs can be used with the different obfuscation techniques to determine what is used to obfuscate data, how, and where the data comes from. The SEDs are responsible for scheduling the obfuscation and de-obfuscation (and re-obfuscation) of the data.

In one embodiment, a security enhanced display driver (SEDD) is provided to schedule content of portions of a frame buffer stored in a video display memory. In one such embodiment, a request to display data to a secure region on a video display made to the SEDD. In response, the SEDD allocates a corresponding secure portion of the frame buffer and schedules the data content of this secure portion such that valid data is only present in the secure portion at the time it is needed for projection to the display device and when other tasks are locked out of accessing (reading or writing) to the secure portion. The SEDD determines, depending upon, the obfuscation techniques used, when data stored in the secure portion needs to be de-obfuscated and when it needs to be re-obfuscated.

In other embodiments, security enhanced drivers are provided for input devices, such as a mouse, keyboard, or other pointing device. These SEDs operate by intercepting the input data as it comes directly from the input device, transforming the data to an obfuscated form when secure input data has been requested, and forwarding the transformed data to the requesting code. When input data is received for a task that has not been authorized to receive secure data, then the input data is forwarded to standard operating system input drivers through a standard input stack.

In some of these embodiments, the SEDs are installed first-in-line in the driver processing sequence to ensure that the SED will intercept the data prior to any other code. In some embodiments, monitoring and/or watchdog services are spawned to ensure the security of these first-in-line hooks.

In yet other embodiments, different techniques are provided to denote various levels of security offered in the system. Some of these techniques present information regarding the source of the security as well. Techniques are present for manipulating standard user interface elements like scroll bars, titles, etc. as well as techniques that modify a cursor representation automatically as input focus travels from one area into a different security area.

DETAILED DESCRIPTION OF THE INVENTION

Figure 1:
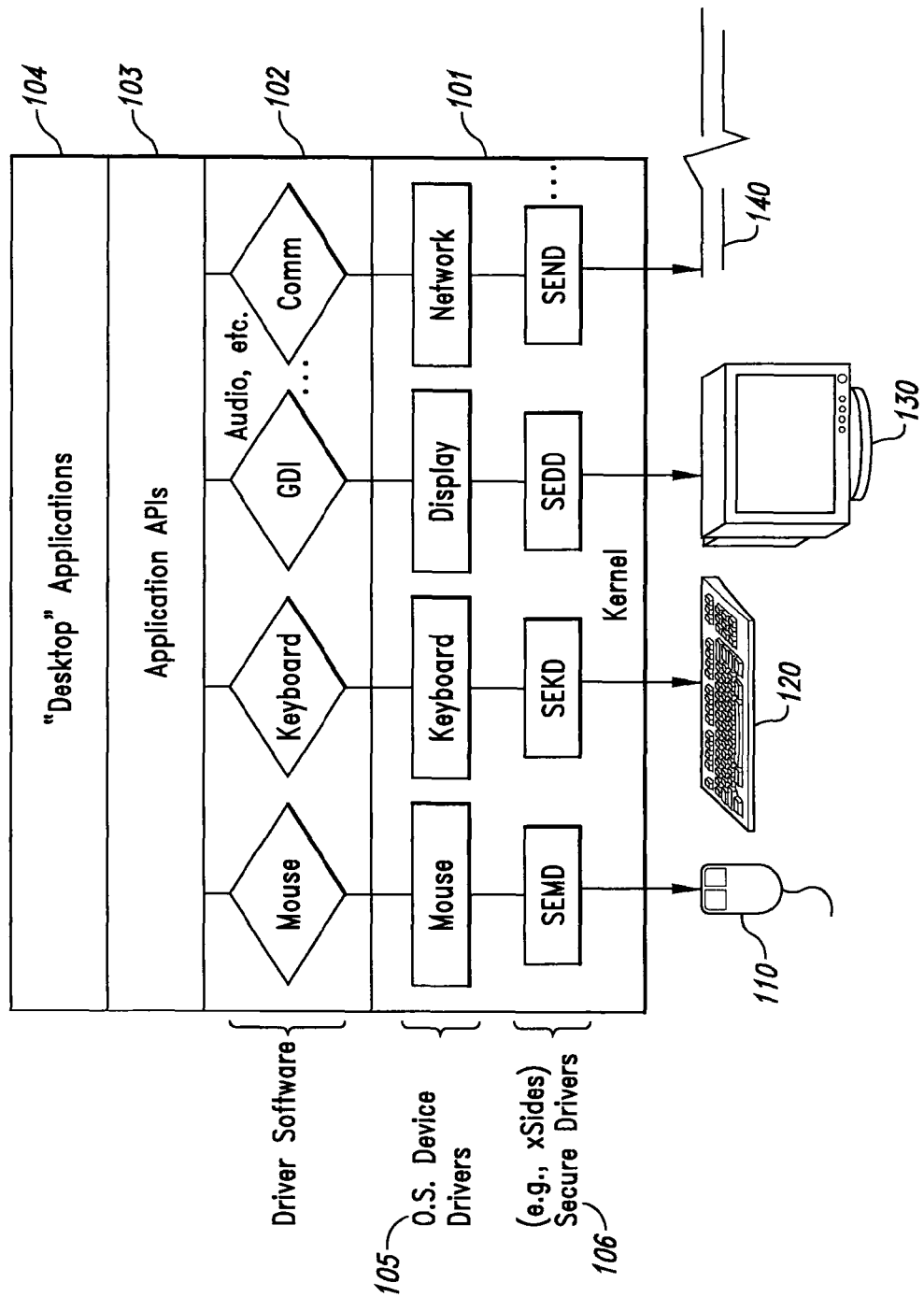
FIG. 1 is an example block diagram of the abstraction layers of a standard computing architecture that includes the security enhanced drivers as provided by embodiments of the present invention.

Embodiments of the present invention provide computer-based methods and systems for enhancing the security of data during input and output on a client computer system in order to prohibit and/or frustrate attempts by illegitimate processes, applications, or machines to obtain data in an unauthorized fashion. For the purposes of this description, "data" includes digital bits or analog signals in a computer system transferred or stored for any purpose, including graphics, text, audio, video, input signals, output signals, etc. Example embodiments provide a plurality of obfuscation techniques and security enhanced (typically, system level) drivers that use these obfuscation techniques to prohibit unauthorized receivers/viewers of the data from receiving/viewing valid data. When these obfuscation techniques are used with the security enhanced drivers, the drivers can ensure that invalid data is always received/viewed by unauthorized recipients/viewers, thus preventing unauthorized hackers with access to valid data. Several obfuscation techniques by themselves offer varying levels of security.

For the purposes of this description, the term "obfuscation" refers to any mechanism or technique for transforming or hiding valid data, so that the valid data becomes difficult to view, intercept, process, or modify without proper authorization, and thus appears as invalid data when accessed in an unauthorized manner. (The word "obfuscate" means to render obscure.) Obfuscation techniques may be implemented as software, hardware, or firmware, depending upon the execution environment of interest. Although standard encryption techniques are one type of obfuscation, a variety of others can be employed including transformations of data between valid forms and invalid forms, temporary and dynamic movement of noise data throughout otherwise valid data, etc. The methods and systems of the present invention describe many techniques for thus preventing unauthorized hacking and retrieval of data. Hacking, for the purposes used herein, describes any type of illegal and/or unauthorized use or view of data, using any technique for intercepting data or for monitoring data or access patterns.

The security enhanced drivers (SEDs) implement varying degrees and levels of security, from simply storing or presenting the data with garbled information or noise, encrypted data, to data that is perceived or received as invalid by unauthorized code. In each case, a central focus of each security enhanced driver is to store and present valid data as obfuscated (and thus invalid) data to unauthorized "clients" (code, users, hardware, etc.). In one embodiment of the present invention, the security enhanced drivers include a security enhanced (video) display driver (SEDD); a security enhanced mouse driver (SEMD), which techniques are useful generally to any pointing type input device (or any x, y coordinate input device); a security enhanced keyboard driver (SEKD); and a security enhanced audio driver (SEAD). Each of these drivers and the concomitant obfuscation techniques that can be applied are discussed in the subsections that follow. One skilled in the art will recognize that other drivers for other types of input and output devices may be similarly designed and/or implemented using the techniques, methods, and systems described herein.

FIG. 1 is an example block diagram of the abstraction layers of a standard computing architecture that includes the security enhanced drivers as provided by embodiments of the present invention. In FIG. 1, as is typical in many computer systems, the operating system layer 101, including the kernel and operating system device drivers (such as the mouse, keyboard, display, audio, and network drivers) resides at the bottom of the software execution architecture. The operating system layer 101 communicates directly with the hardware and/or hardware interface cards, such as mouse 110, keyboard 120, display 130, and network interface card 140. One skilled in the art will recognize that other hardware and other drivers even though not shown (including audio players and associated operating system audio drivers) also may reside in such a system. Above the operating system device drivers, other (typically, higher level) driver software 102 executes and provides more complex abstractions of the hardware to the applications layer 104 and application software libraries 203. Driver software 102 includes interfaces and libraries of functions that help applications receive and process input and output such as a mouse and keyboard interface providing by a windowing interface, or a display interface such as Windows operating system GDI. Applications APIs 103, often provide even higher level abstractions to applications 104, such as reusable objects that can be sub-classed in object-oriented application code. At the top level, the (desktop) applications 104 typical execute on top of all of the other layers and communicate progressively through each layer to process input and output from and to the hardware. In some embodiments of the present invention, the security enhanced drivers (SEDs) 406 preferably reside between the operating system device drivers 405 and the hardware so as to better control secure processing of input and output in the lowest layers of a computing system.

In order to implement data obfuscation in a manner that ensures valid data only to authorized clients, each SED typically needs to have some type of mechanism for locking out a part of the system (a resource such as a portion of a frame buffer on a video card). Because varying operating systems (kernels, or other process schedulers) provide different mechanisms for ensuring that a driver will have "priority" in the scheduling of operating system tasks (processes, threads, code of any type, etc.), it is often necessary to implement a mechanism for ensuring that a SED is a "first level driver" in the system. That is, a mechanism needs to be present to ensure that the driver that is "hooking" the input or output can obtain the data first, before other drivers or code, such as operating system drivers (OS device drivers 105 in FIG. 1). One technique is to implement the SED as a system level driver, initialize the system to include this driver as the first driver "in line" (of its type, or in the overall event processing driver chain, where applicable), and to provide a "watchdog" process for monitoring the position and security of the SED. Different operating systems require different techniques for installing a driver as first-in-line, and what first-in-line means. Techniques for installing a driver as first-in-line will be apparent to those skilled in the art, depending upon the operating system. A description of example implementations using Windows 9x and Windows NT derivatives is described in the section entitled "First-in-line SED Installation and Watchdog Monitoring."

To complement the obfuscation techniques and security enhanced drivers, the methods and systems of the present invention also provide different techniques for denoting various levels of security in the system. Example screen displays of these techniques are provided and described relative to FIGS. 24-25. One skilled in the art will recognize that other techniques for denoting security are possible and equivalent in function.

Secure Storage and Display of Video Content

Figure 2:
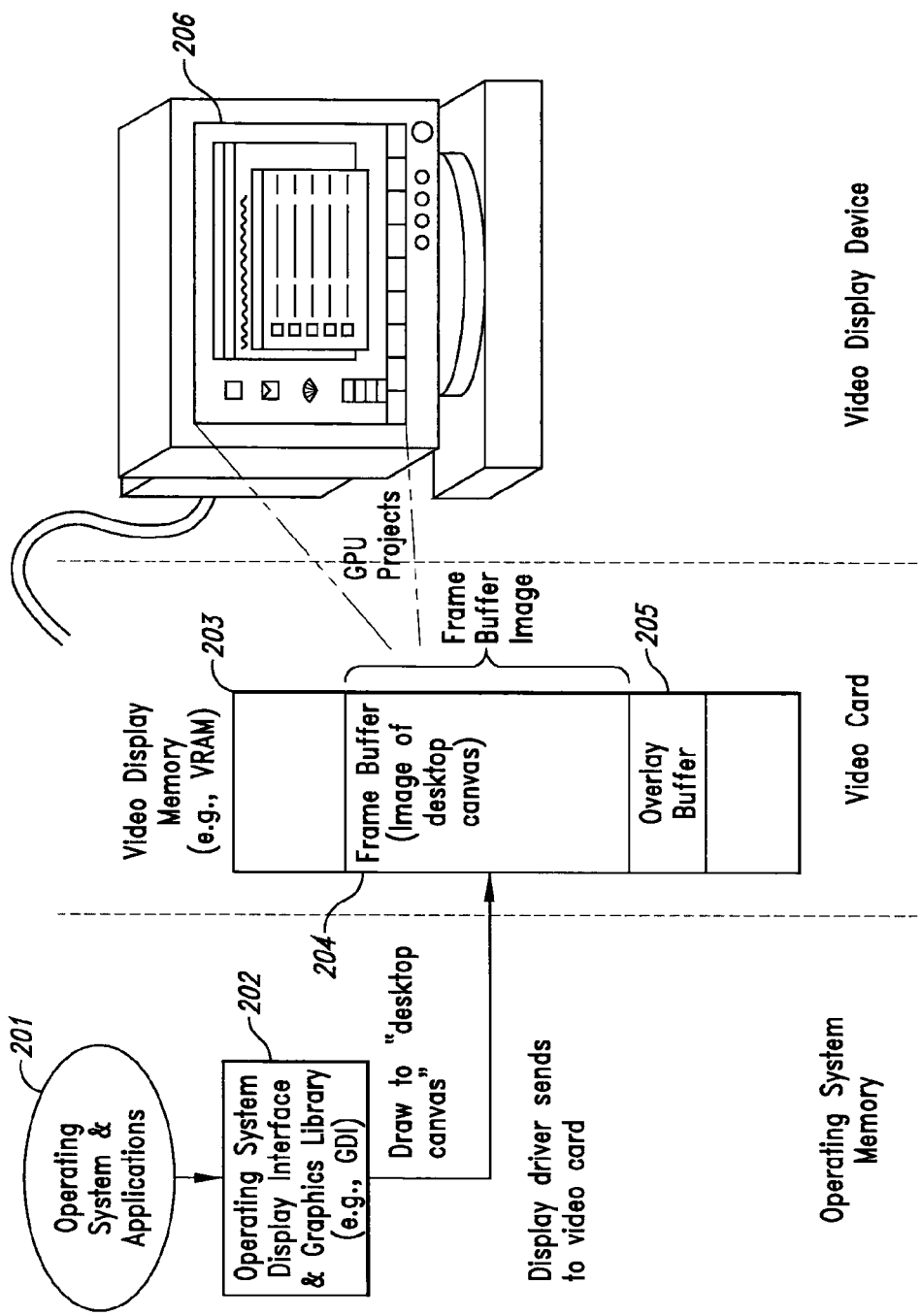
FIG. 2 is an example block diagram of how data is transferred to a display device in a typical computer system.

Video content is generally vulnerable to hacking on a variety of levels and in different scenarios. FIG. 2 is an example block diagram of how data is transferred to a display device in a typical computer system. In FIG. 2, the operating system and applications 201 communicate with an operating system display interface 202 (typically, a graphics library such as GDI in the Window operating system environment) to draw to a "desktop canvas"—a bitmap representation of the area of the display device 220 that the operating system controls for its user interface. (This bitmap is typically stored in random access system memory (RAM) and may be hidden to applications through mechanisms of the OS.) The display driver of the operating system (OS) than sends this bitmap to the video card for storage in the video display memory 203 (e.g., VRAM) residing on the card. The bitmap to be drawn is typically stored in a designated portion of the VRAM, called the frame buffer 204, as a static bitmap. The area of the frame buffer 204 that corresponds to the portion of the display device 220 (screen) used by the OS user interface (typically referred to as the "Desktop") may be a portion of the entire frame buffer 204. That is, the operating system 204 (and applications) may not use the entire displayable area of the display 220. The portion of the display 220 used by the operating system 204 is typically described and set by well-known video modes, represented in resolution coordinates, such as a 1024×768 (pixel) area. (Applications and techniques for extending the use of a display device (through what is sometimes referred to as "physical overscan"), or for sharing the display device between the OS user interface and an area of the display not accessible to the OS, are described in detail in co-owned U.S. patent application Ser. No. 09/726,202, entitled "Method and System for Controlling a Complementary User Interface on a Display Surface," filed Nov. 28, 2000, U.S. Pat. Nos. 6,018,332, entitled "Overscan User Interface," issued on Jan. 25, 2000, and 6,330,010, entitled "Secondary User Interface", issued on Dec. 11, 2001, and other related patents.) The VRAM 203 is also used by the video card (and video drivers) to store other types of information. In a typical PC environment, now with advanced video cards, one or more "overlay" buffers 205 may reside also in the VRAM 203. In these cards, advanced logic is provided to enable a graphics processing unit (GPU) (or other element responsible for transferring data from VRAM 203 to the display screen 220) to "overlay" bits from the overlay buffer 205 as the GPU is copying out bits from the frame buffer 204 to the display 220. In some cards, the overlay bits are combined with corresponding bits from the frame buffer 204 using complex logic, ranging from "AND" and "XOR" operations to other types of percentage operations. (For example, the GPU may combine 70% of bit x, y from the frame buffer 204 "OR"ed with 30% of bit w, z from the overlay buffer 205, sometimes referred to as alpha blending.) Such cards often provide these bitmap operators to combine an area of VRAM 203 with another area of VRAM 203 (or designated memory elsewhere) to code other than the GPU, and will be referred to as Raster Operations.

Figure 3:
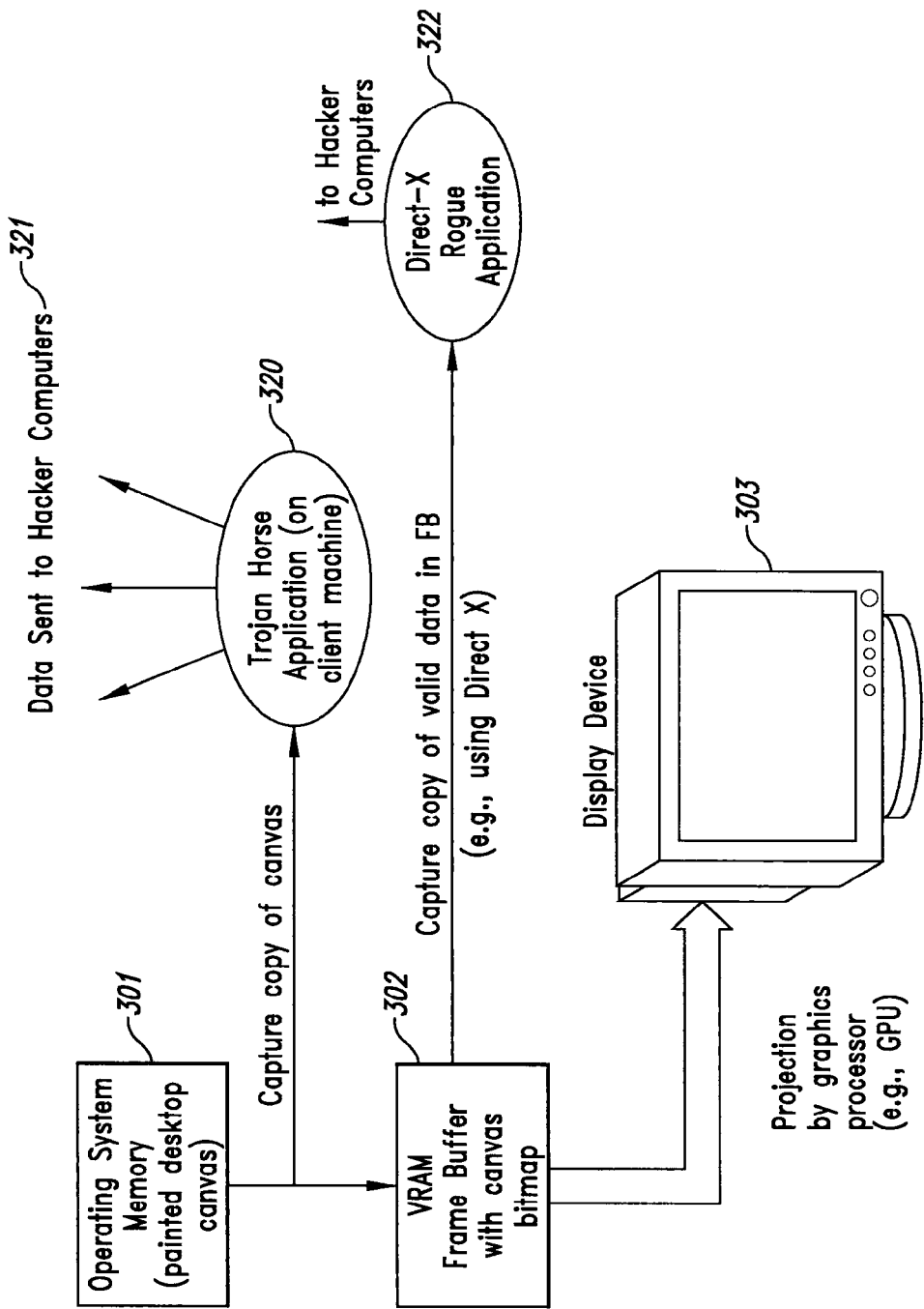
FIG. 3 is an example block diagram that shows how display hacking occurs.

While the data is stored in an area of the VRAM 203 that is accessible to system level code (such as software and hardware video drivers, and other code that known how to communicate directly with the video card, e.g., Direct-X and DirectDraw), which is typically when the data is appearing on the display device 220, the data is vulnerable to hacking by malicious programs. FIG. 3 is an example block diagram that shows how display hacking occurs. In FIG. 3, the operating system memory (RAM) 301, as was described in FIG. 2, holds the bitmap that represents the desktop canvas. At this point, Trojan Horse application 320 can access a copy of the desktop canvas (if it knows how to locate the desktop canvas in RAM) and can transfer that copy, across a network or by any other data communication path to other computers, such as hacker computers 321. (The application 320 is referred to as a "Trojan horse" because it has been injected, typically, in an unauthorized and undetected fashion onto the client computer system.) One technique for avoiding such unauthorized access is for the operating system to store the bitmap in an obfuscated form and de-obfuscate (or un-obfuscate) the bitmap when it is sent to the video card to be stored in VRAM 302. The term de-obfuscate (or un-obfuscate) is used to refer to the reverse process used to obfuscate data. Thus, for example, decryption of encrypted data is a de-obfuscation process, as is applying an XOR operation with a mask to data that has been obfuscated by applying an XOR operation to that same mask.

Once the data is stored in VRAM 302, the data is still vulnerable to illicit copying or viewing by an unauthorized client, for example, a rogue application 322 that uses a library, such as Direct-X, to communicate directly with the video card. The data is ripe for hacking as long as the video card needs to store the valid data in VRAM to allow the GPU to project the data onto display device 303. A Security Enhanced Display Driver is provided by the methods and systems of the present invention to prevent this type of hacking at lower levels in the system; that is, the enhanced driver supports techniques that secure designated data that is temporarily stored in conjunction with the video card and display mechanisms.

Figure 4:
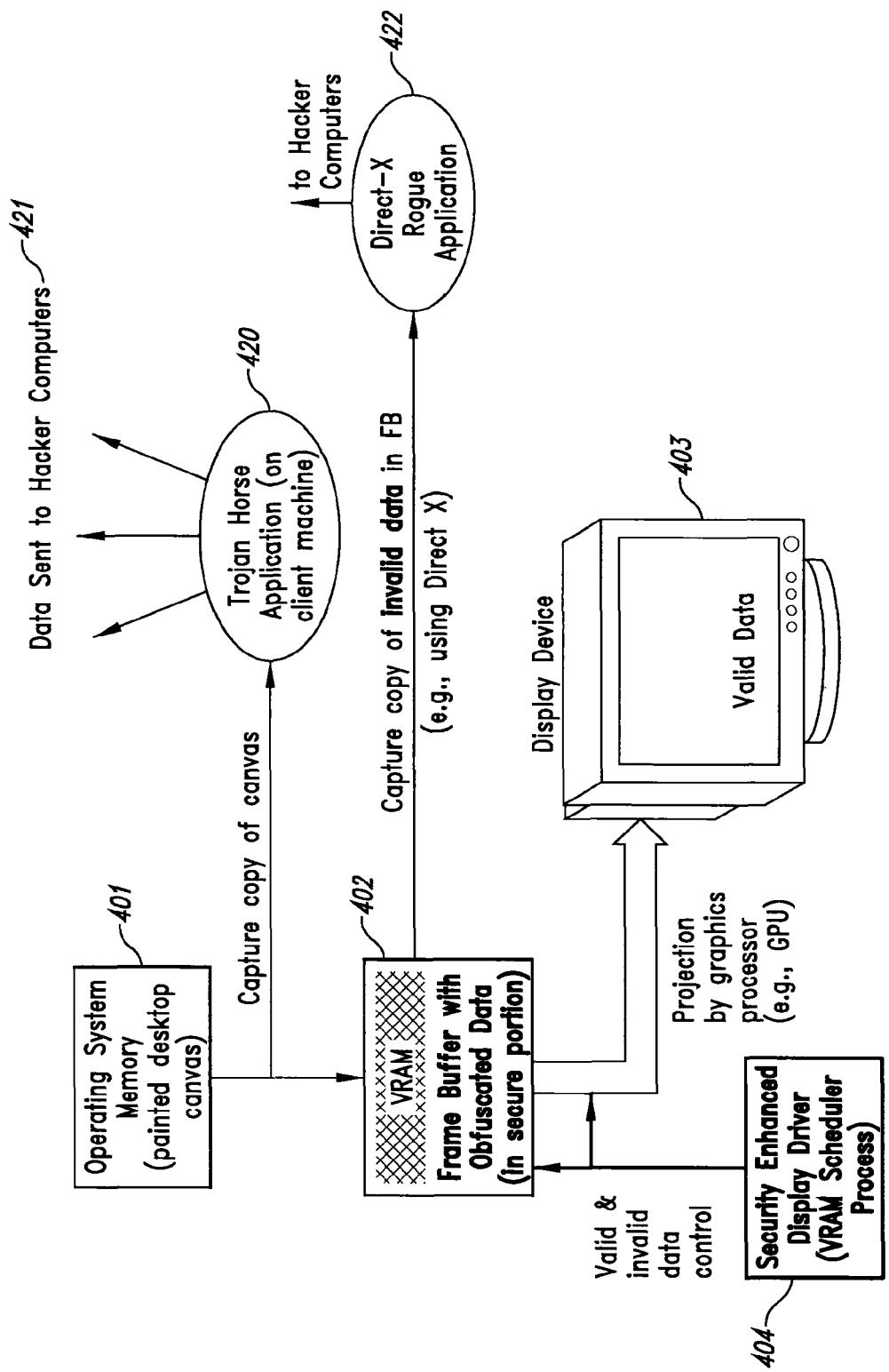
FIG. 4 is an example block diagram of the general techniques used by an example Security Enhanced Display Driver to prevent unauthorized access to data stored in a frame buffer.

FIG. 4 is an example block diagram of the general techniques used by an example Security Enhanced Display Driver to prevent unauthorized access to data stored in a frame buffer. The diagram shows the same components as shown in FIG. 3, and the attempted hacking mechanism, but adds an additional component, the Security Enhanced Display Driver (the SEDD). The SEDD operates by applying obfuscation techniques to data stored in designated areas (and potentially the whole) of the frame buffer in VRAM 402 so that, even if an unauthorized application, such as rogue application 422 attempts to copy-out data from the frame buffer 402, the data is invalid data because it has been obfuscated by the SEDD. Since the SEDD obfuscates (one or more) portions of the frame buffer 402, in order to effectively display the valid (un-obfuscated) data, the SEDD 404 needs to temporarily de-obfuscate the data, so that the GPU copies out valid data at the time the GPU requires the data to be valid for correct display on display device 403. Thus, in general, the SEDD 404 acts as a "scheduler" process for the content of the frame buffer, in that it controls when the frame buffer holds valid data and invalid data, where the valid/invalid data is located in the frame buffer, and where the valid/invalid data is stored to be used to populate areas in the frame buffer. The SEDD may incorporate a variety of mechanisms to obfuscate and de-obfuscate data, including those described below with reference to FIGS. 6-9.

In one embodiment, the SEDD supports the ability for an application (or other code) to define a region on the display device as a "secure region." Depending upon the level of security implemented in the particular system, the SEDD is able to guarantee that level of security for the secure region. For example, if the highest level of security is offered, the SEDD ensures that no unauthorized process can view or intercept the valid data, from the frame buffer, while it is being displayed in the secure area. In that scenario, a user can see the data on the display screen, but the secure region appears obfuscated to all code (other than the scheduler and driver processes).

Figure 5:
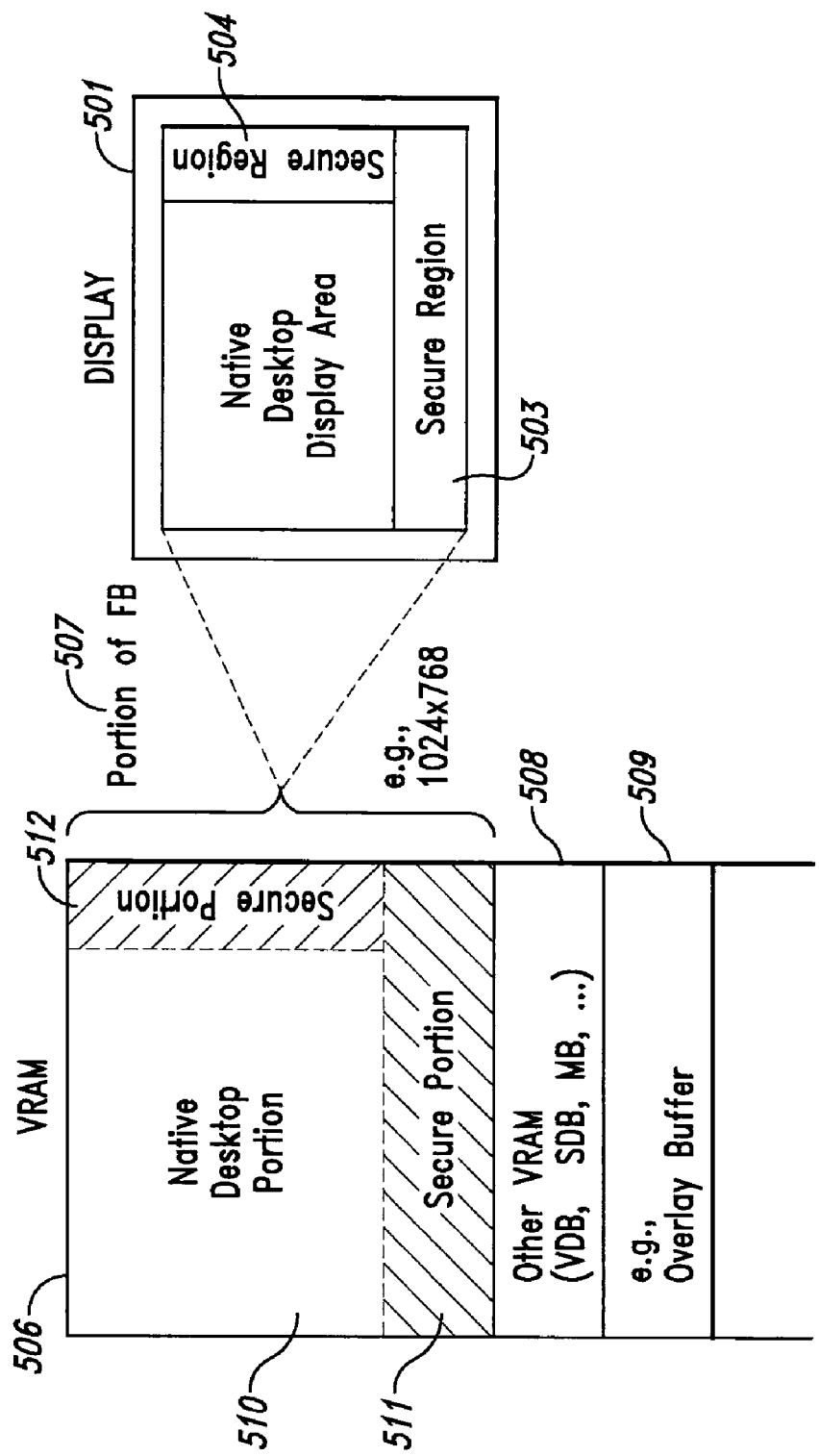
FIG. 5 is an example block diagram of a designated secure portion of the video display memory (VRAM) as provided by an example Security Enhanced Display Driver.

FIG. 5 is an example block diagram of a designated secure portion of the video display memory (VRAM) as provided by an example Security Enhanced Display Driver. The VRAM 506 is shown in correspondence to the portion of the frame buffer (in this case the whole frame buffer) displayed on display device 501. The frame buffer 507 in this example is shown as a 1024×768 pixel area on display device 501. On display device 501, the native desktop display area 502 (operating system controlled user interface) is shown in conjunction with two designated secure regions 503 and 504. In the corresponding positions in the frame buffer 507 of the VRAM, the native desktop portion 510 is shown in conjunction with secure portions of the frame buffer 511 and 512. To other code, secure portions 511 and 512 appear as obfuscated (as noted there by crosshatching). Other storage locations are also resident in VRAM 506, such as secure driver areas 508 and an overlay buffer 509. Secure driver areas 508 store different buffers used by the SEDD and are not allocated by standard OS and programming means (i.e., a "malloc" function), but rather are explicitly requested from the video card and thus access can be better controlled by the SEDD. In particular, buffers for holding valid data (a Valid Data Buffer, or VDB), encrypted or masked valid data (a Secure Data Buffer, or SDB) and a mask buffer (Mask Buffer, or MB) are shown residing in Other VRAM 508.

Once one or more secure regions are defined, the content of the frame buffer (FB) is appropriately scheduled by the SEDD. In essence, the SEDD ensures that the contents of the secure portion of the FB that corresponds to the secure region on the display contains valid data when the GPU needs to read it (or the GPU obtains the valid data through other means), and at (effectively and practically speaking) all other times, the contents of the secure portion contains obfuscated data. The various obfuscation and de-obfuscation approaches used in conjunction with the SEDD are described with reference to FIGS. 6-9. One skilled in the art will recognize that other variations and nuances of these approaches and new approaches yet to be developed are operable with the SEDD and contemplated as part of the invention and that those discussed below are provided as examples. Also, one skilled in the art will recognize that the separate "cases" shown are organized as such for ease of description and may or may not resemble any actual implementation or division of functionality.

Figure 6:
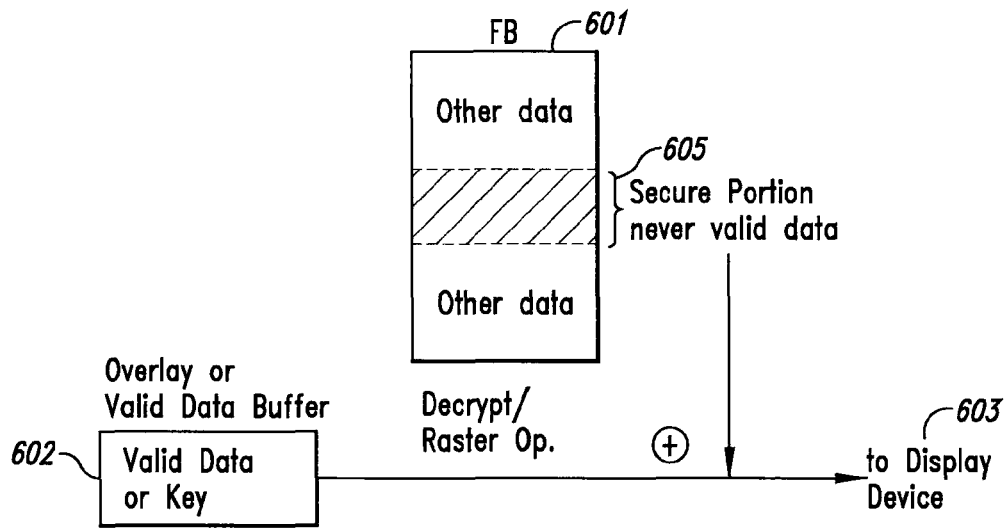
FIG. 6 is an example block diagram of obfuscation techniques used in conjunction with "copy out" de-obfuscation techniques.
Figure 6:
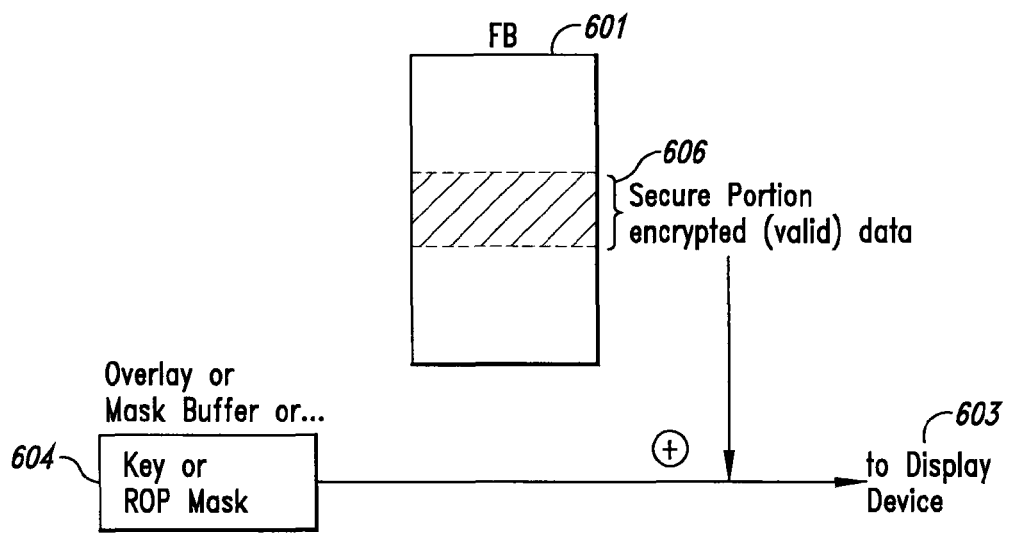

The first obfuscation/de-obfuscation approach is termed "copy out," because, in summary, valid data is provided by the SEDD to be projected on the display device at "copy out" time—when the GPU copies the secure portion of the frame buffer to the corresponding secure region on the display. FIG. 6 is an example block diagram of obfuscation techniques used in conjunction with "copy out" de-obfuscation techniques. According to the "copy out" approach, the data in the secure portion is invalid, thus the complex scheduling techniques that insert valid data in the frame buffer at critical times and restore invalid data at other times are not necessarily used. (These complex scheduling techniques are discussed below with reference to FIGS. 10-17.) In particular, valid data is passed to the display device; however, it may not be directly copied out from the frame buffer (FB). Preferably, the resident technique used by the video card (the GPU) to combine the overlay buffer with the frame buffer prior to projection is instead used to combine the obfuscated data in the frame buffer with the data in the overlay buffer.

There are two cases to consider. In the first case, Case 1, the frame buffer 601 contains invalid data in the secure portion 605 and valid data is stored in another buffer 602. Other data (shown as valid data) is stored in the areas of the frame buffer that are not designated as secure portions. The SEDD uses the valid data in buffer 602 to overwrite the contents of secure portion 605 when the FB data is copied out to the display device 603. The buffer 602 could be the overlay buffer, in systems that support direct raster operation combinations of the contents of the overlay buffer and the frame buffer. Further, the overlay buffer may contain an encrypted version of the valid data (with noise, for example, stored in the secure portion 605). In the latter case, a decryption key is stored in some auxiliary location. One skilled in the art will recognize that, although referred to as the overlay buffer (for video card and system supported mechanisms), other buffers such as a valid data buffer (VDB) or a secured data buffer (SDB), stored elsewhere in VRAM may be used in combination with raster operations. In the second case, Case 2, the invalid data stored in the secure portion 606 is an encrypted or masked version of the valid data and an encryption key or a mask used to unmask the masked version of the valid data is stored in another buffer 604. The key or mask stored in the buffer 604 is used to create valid data on copy out by either decrypting the data stored in the secure portion 606, or by combining the data stored in the secure portion 606 using a Raster Operation (ROP) and the mask stored in the buffer 604. The primary distinction between the first and second cases is whether the data stored in the other buffer (602 or 604) is valid data or other (key or mask) data. One skilled in the art will recognize that some use the work "mask" interchangeably with the term "key," and for the purposes described herein, the terms are interchangeable.

Figure 7:
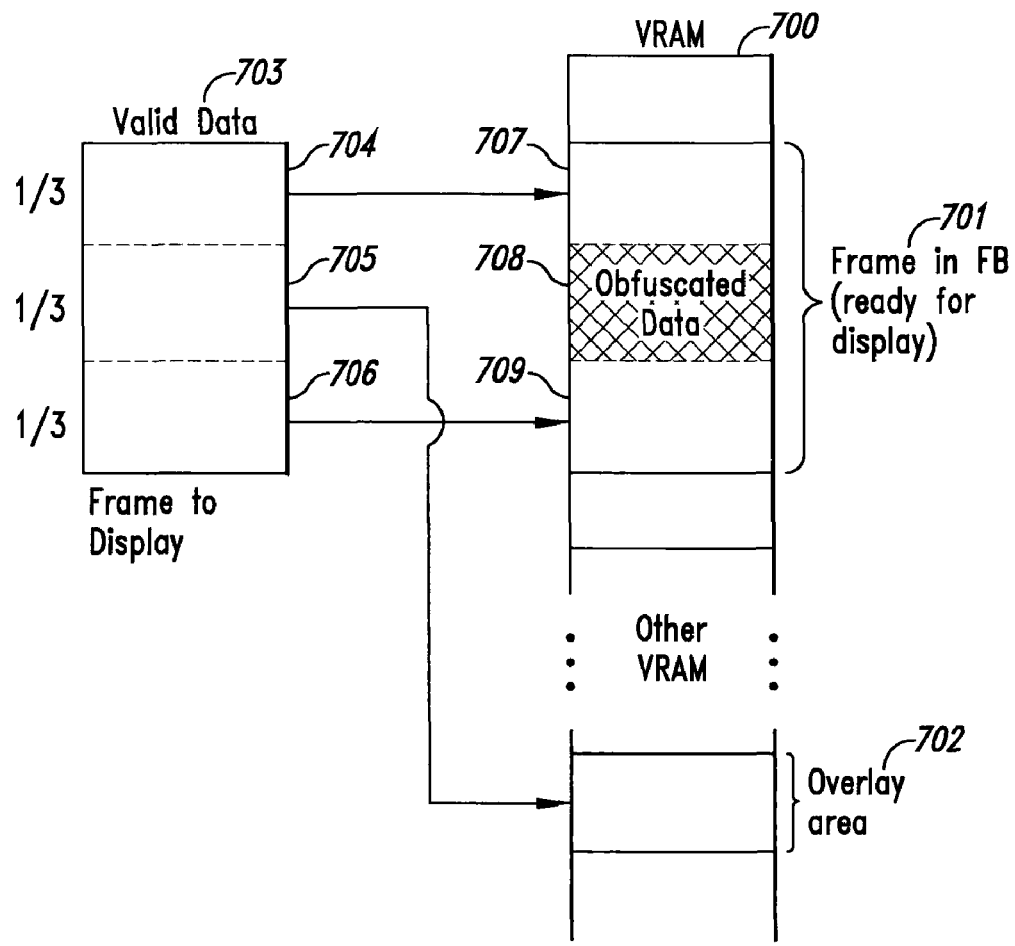
FIG. 7 is an example block diagram of variations on copy out de-obfuscation techniques.
Figure 7:
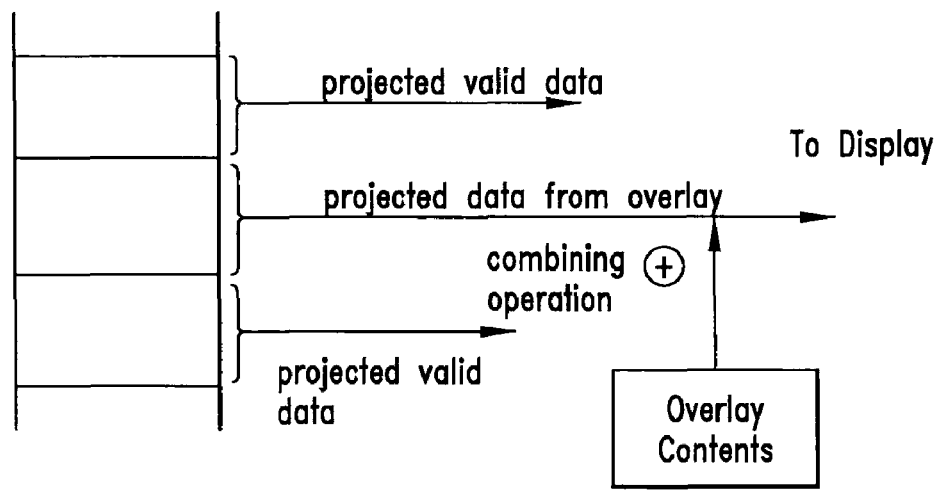

FIG. 7 is an example block diagram of variations on copy out de-obfuscation techniques. This technique is useful in combination with the "copy-out" techniques of FIG. 6 to partially obfuscate a secure portion of the frame buffer. In particular, in FIG. 7, VRAM 700 is shown with a secure portion (herein termed a "frame") ready to be displayed. Instead of, as in FIG. 6, obfuscating the entire secure portion, a technique is used to subdivide the secure portion into, for example, three sub-portions, and to treat one of the sub-portions as the obfuscated area that is overwritten by valid data or is used to create valid data (cases 1 and 2 in FIG. 6). In the example shown, valid data (the frame to be displayed) from the operating system being sent to the video card (through the SEDD) is subdivided in three subparts before it is stored in the VRAM. The first subpart 704 of valid data is loaded into the first sub-portion 707 of the frame buffer; the middle subpart 705 of valid data is stored in the overlay buffer 702; and the last subpart 706 is stored as valid data in the third sub-portion 709 of the frame buffer. Obfuscated data (of any desired content or format and from any source) is stored in the middle subpart 708 of the frame buffer. The bottom portion of FIG. 7 shows how a GPU would use a combination of the overlay buffer and the portions of the frame buffer to generate valid data for projection on the display device.

Figure 8:
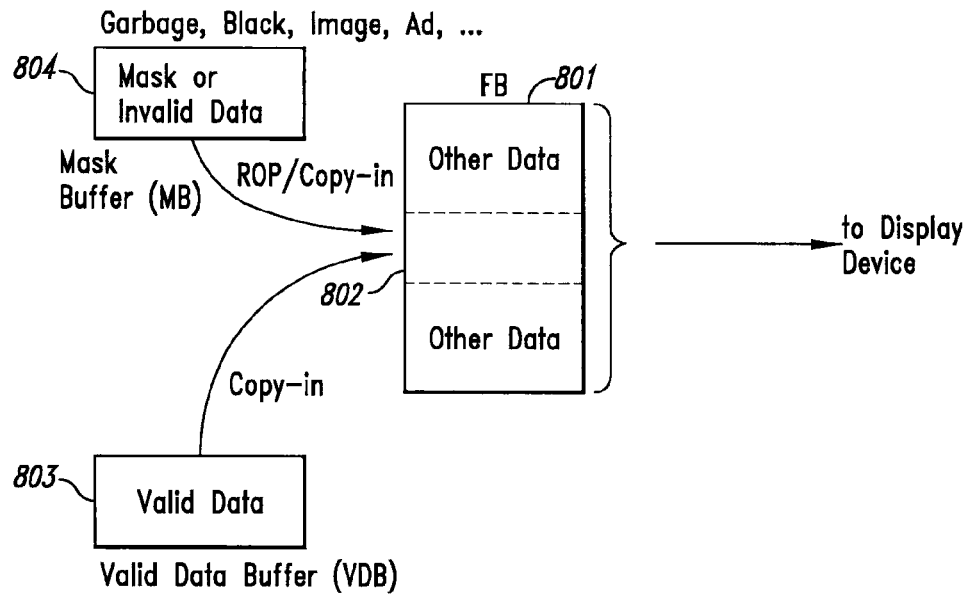
FIG. 8 is an example block diagram of obfuscation techniques used in conjunction with "replace and restore" de-obfuscation techniques.
Figure 8:
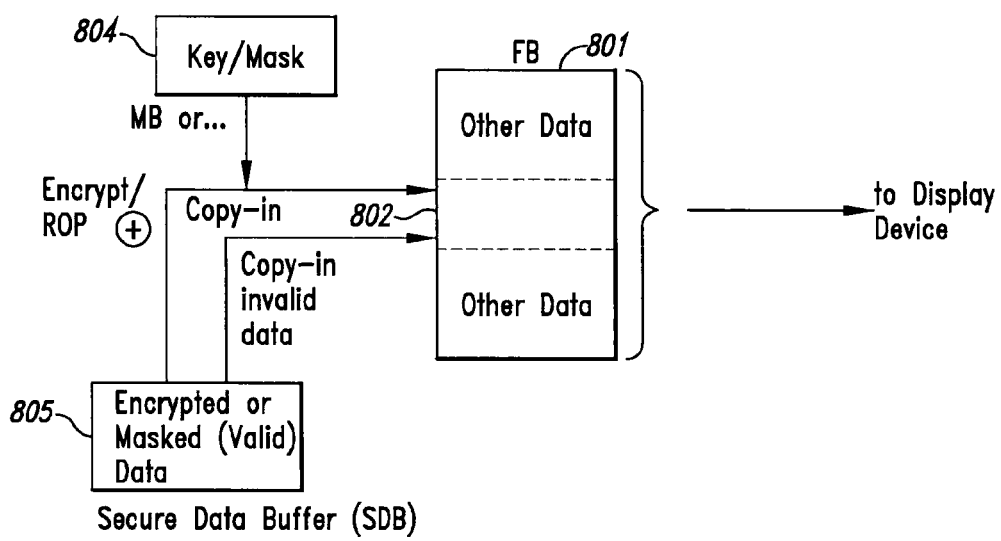

The second obfuscation/de-obfuscation approach is termed "replace and restore," because, in summary, the SEDD provides valid data by replacing the invalid data stored in the secure portion of the frame buffer with valid data just prior to being projected (or during projection) on the display device—when the GPU copies the secure portion of the FB to the corresponding secure region on the display—and provides obfuscated data by restoring the invalid data after (or during the time) the secure portion of the FB is projected by the GPU. (The exact timing of the de-obfuscation and re-obfuscation is dependent upon whether data is being handled pixel-by-pixel, scan-line at a time, or in block operations.) FIG. 8 is an example block diagram of obfuscation techniques used in conjunction with "replace and restore" de-obfuscation techniques. In FIG. 8, the frame buffer 801 (initially) contains obfuscated data in the secure portion 802 of the FB. Other data (shown as valid data) is stored in the areas of the frame buffer that are not designated as secure portions. Again, there are two cases to consider, which differ as to whether valid data destined for the secure portion of the frame buffer is stored as valid data (e.g., in a valid data buffer, VDB) or is stored as encrypted or masked data (e.g., in a secure data buffer, SDB) which is decrypted or de-masked prior to copying in the "valid" data into the frame buffer.

In particular, in Case 3, valid data is stored in valid data buffer (VDB) 803 and obfuscated data (or data, for example, a mask, used to obfuscate the contents of the secure portion of the FB) is stored in a mask buffer (MB) 804. Recall that these buffers may be stored wherever it is convenient in the system and meets the security needs intended. The SEDD, at an appropriate time prior to the time when the contents of the secure portion needs to be valid for projection, copies in valid data from VDB 803. After the valid data has been scanned and copied out for projection to the display (or sometime in the interim), the SEDD copies-in the invalid data from the mask buffer 804 in order to re-obfuscate the secure portion of the FB 802. Note that, although shown as coming from the mask buffer 804, one skilled in the art will recognize that the invalid data may be created any number of ways, including system operations, machine instructions, or other means that turn a set of bits on (all black) or clear the bits (all white). As shown in the figure, when the obfuscated data is to be formed by masking versions of the valid data, then a mask can be stored in MB 804 and applied to the already copied-in valid data stored in the secure portion 802 using ROPs to recreate the newly obfuscated data. Alternatively, when the obfuscated data is invalid data such as a logo, advertisement, or random bit patterns, then invalid data from the mask buffer 802 can be copied in to the frame buffer as is.

In Case 4, valid data is only stored in a more secure form (such as stored as encrypted or masked data) in secure data buffer (SDB) 805. This same encrypted or masked data (since it is "obfuscated" data) is used as the invalid data to be copied in to the secure portion of the FB when obfuscated data is to replace the valid data in the frame buffer. A mask or key is stored in mask buffer (MB) 804 to be used by the SEDD to decrypt or de-mask the secure data stored in SDB 805. Thus, the SEDD, at an appropriate time prior to the time when the contents of the secure portion 802 needs to be valid for projection, creates valid data to copy in from the SDB 805 by applying (decrypting or de-masking) a key or mask from the MB 804 to the secure data stored in the SDB 805, and copies out the result (valid data) to the secure portion of the FB 802. Similarly, after the valid data stored in the secure portion 802 has been scanned and copied out for projection (or thereabouts), the SEDD copies-in the invalid data (the encrypted or masked form of the valid data) from SDB 805 in order to re-obfuscate the secure portion of the FB 802.

Figure 9:
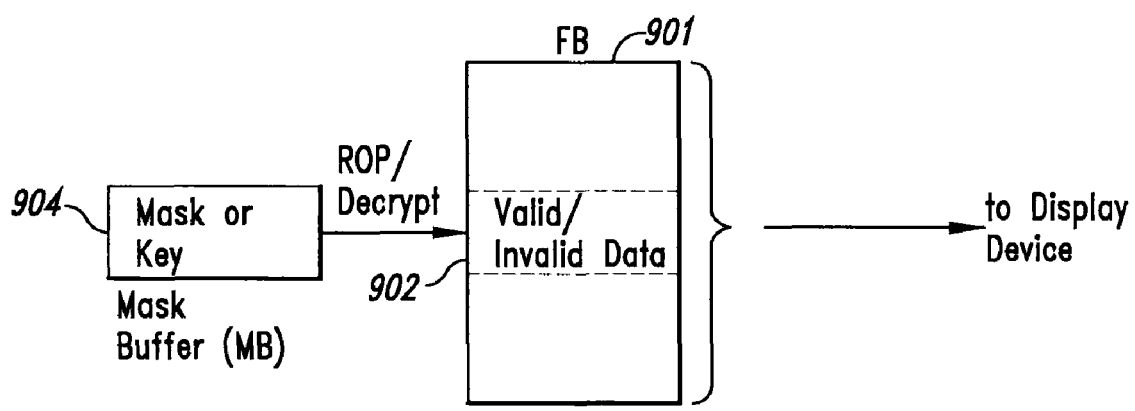
FIG. 9 is an example block diagram of obfuscation techniques used in conjunction with "in-place replacement" de-obfuscation techniques.

The third obfuscation/de-obfuscation approach is termed "in-place replacement," because, in summary the SEDD provides valid data in the secure portion of the frame buffer by manipulating the invalid data in-place just prior to being projected on the display device—when the GPU copies the secure portion of the FB to the corresponding secure region on the display—and then provides invalid data by manipulating (toggling) the valid data in-place to once again generate invalid data. FIG. 9 is an example block diagram of obfuscation techniques used in conjunction with "in-place replacement" de-obfuscation techniques. In FIG. 9, the frame buffer 901 (initially) contains obfuscated data in the secure portion 902 of the FB. The obfuscated data is a secure version of the valid data, such as an encrypted or masked form of the valid data. Hence, to create valid data from the obfuscated data (to de-obfuscate the data) stored in the secure portion of the FB 902, the SEDD applies an appropriate key or mask, stored in mask buffer (MB) 904, to decrypt or to de-mask the data as appropriate. Like the approaches "replace and restore" approach described with reference to FIG. 8, the SEDD performs the de-obfuscation and re-obfuscation at the appropriate times to ensure that projection of valid data is possible and that no other code has access to the valid data that corresponds to the secure portion 802.

Figure 10:
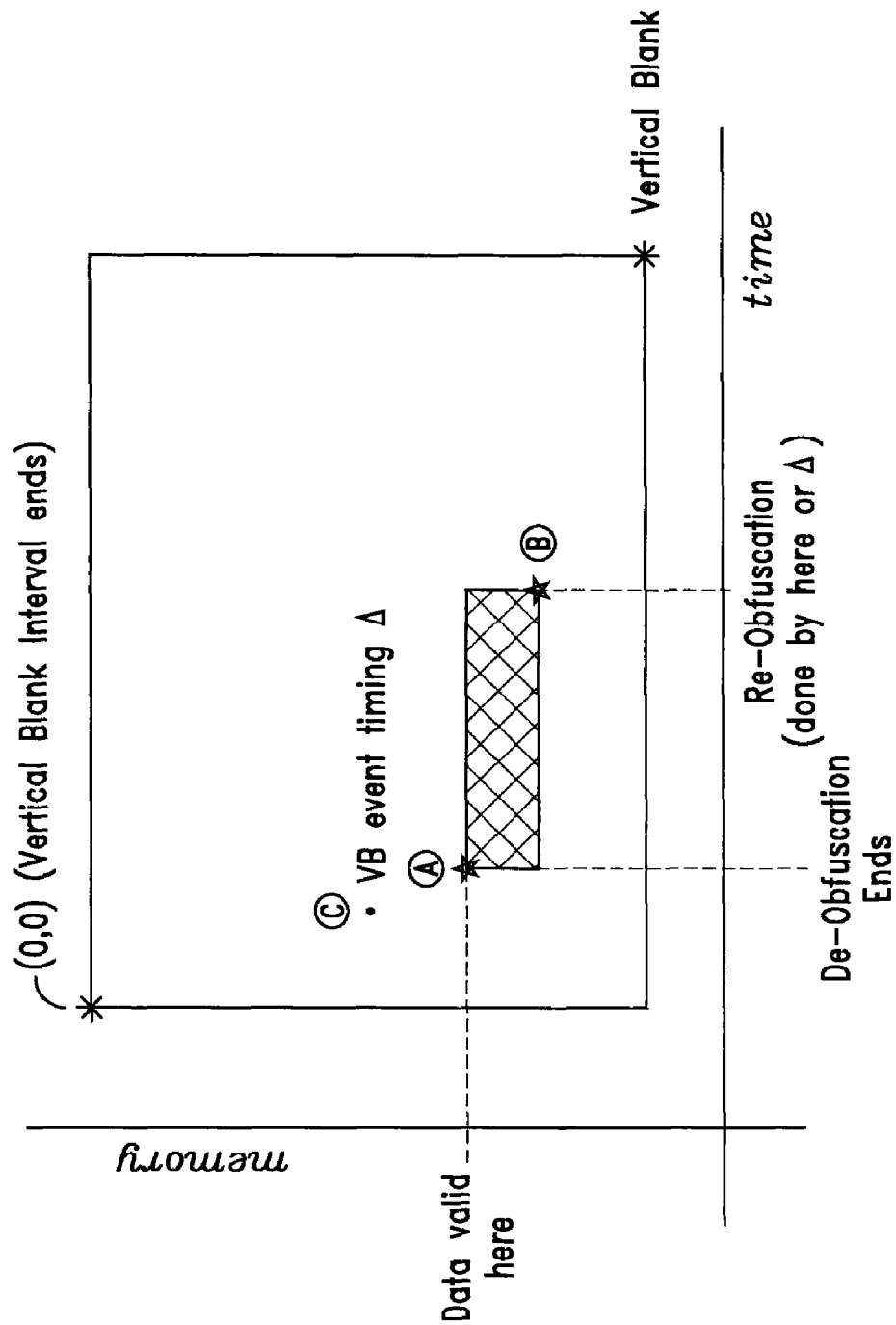
FIG. 10 is an example illustration of the scheduling of obfuscation and de-obfuscation of the contents of the frame buffer by an example Security Enhanced Display Driver.

As described relative to FIGS. 8 and 9, the SEDD needs to schedule the de-obfuscation and re-obfuscation of data stored in a secure portion of the frame buffer in order to coordinate valid data for projection use and obfuscated data for security. FIG. 10 is an example illustration of the scheduling of obfuscation and de-obfuscation of the contents of the frame buffer by an example Security Enhanced Display Driver. The graph shown in FIG. 10 relates the time taken for a display gun to scan data (typically scan line at a time) from the frame buffer for projection on the display device to the address locations in the frame buffer memory. A vertical blank signal is given by the gun when it reaches the end of scanning the display, just prior to its return to scanning the first line on the display screen. The time the gun takes to travel from the lower rightmost corner to beginning scanning again in the upper leftmost corner is referred to as a vertical blank interval (this when the screen used to "blink" prior to advanced technical which makes this time virtually undetectable). This time is calculable for a particular system whose gun paints at a particular rate (typically in hertz).

Note that the (0,0) point is simply an origin relative to the screen (the upper leftmost corner). The actual portion of the display screen being used by the operating system and other code, may in fact be less than the total amount on the screen. The relative origin point in the frame buffer used as a data source for what is scanned to the display is also described as (0,0), however, it will be understood that this point is not necessarily the first address location available in the frame buffer.)

The gun projects scan lines (travels) at a particular rate. The SEDD needs to determine when the gun will reach point A. Point A represents the time (relative to the VB signal end at origin 0,0) the gun will reach the beginning of a designated secure region on the display, which corresponds to a designated secure portion of the frame buffer (memory). At point A, the data in the secure portion of the FB needs to be valid data. Point B represents the relative time when the gun will reach the end of scanning the designated secure region on the display, which corresponds to the end of the secure portion of the frame buffer. By point B, the data in the secure portion of the FB needs to be obfuscated data, so that other code (code other than any SEDD code used in the scheduling of frame buffer content) cannot view or intercept valid data. In reality, due to system latencies, including the VB interval to start scanning from the display origin, the time to load code and invoke processes, threads etc., and due to any time needed for the de-obfuscation (including in some cases decryption) to occur, the SEDD needs to start the process of de-obfuscated the data stored in the designated secure portion of the frame buffer at some time prior to when it is needed at point A. Point C represents this time delta. One skilled in the art will recognize that the values of points A, B, and C are highly system dependent. Points A and B can be determined by polling for the VB signal or, in an event-driven system that supports VB events, by receiving a VB event and calculating (knowing the travel rate of the gun) the time it will take to reach point A and point B. Point C, however, the time delta, is typically determined empirically, based upon system latencies and the particular obfuscation and de-obfuscation techniques being used. In general, point C is:

$$\text{point A (in time)} - \text{system latency time} - \text{de-obfuscation process time} \quad (1)$$

One skilled in the art will recognize that many different techniques can be used from a scheduling perspective for re-obfuscating the data by point B. For example, the re-obfuscation process make take place a scan line at a time, pixel by pixel, or as a block of memory. Thus, the process may trail the gun by some interval. As described below relative to FIG. 17, in one embodiment, re-obfuscation is performed right after the secure region is scanned for projection onto the display.

Also, in order to prevent other code from accessing the valid data while it is present in the secure portion of the frame buffer, some process/thread locking mechanism needs to be employed to lock out other code during critical intervals. In the embodiment described below relative to FIGS. 12-17, a real time, highest priority thread is used to copy-in the valid data and to re-obfuscate the data prior to relinquishing control. One skilled in the art will recognize that other mechanisms can be used, and the level of security provided by the system is commensurate with how lock proof the locking mechanism is.

Figure 11:
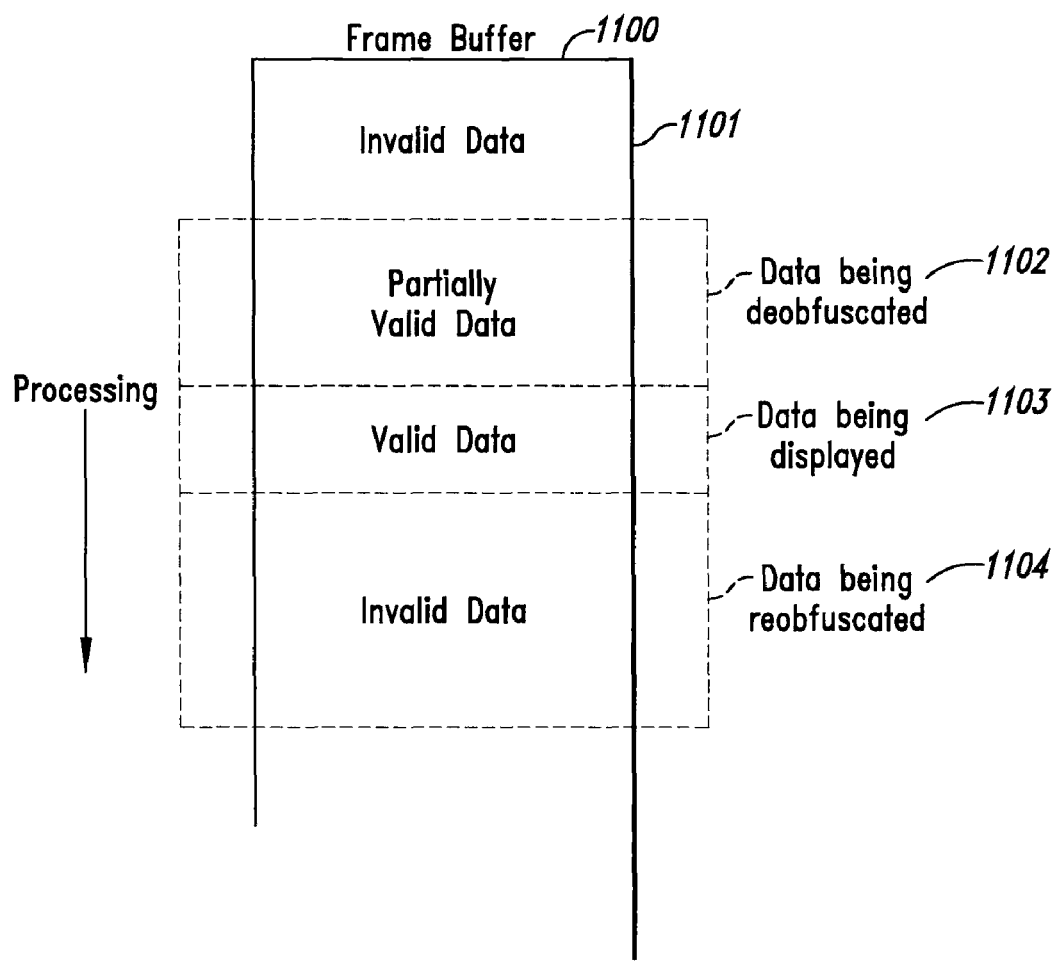
FIG. 11 is an example block diagram of an alternate obfuscation/de-obfuscation approach that can be used to schedule the timing of obfuscation and de-obfuscation of the entire frame buffer.

FIG. 11 is an example block diagram of an alternate obfuscation/de-obfuscation approach that can be used to schedule the timing of obfuscation and de-obfuscation of the entire frame buffer or some portion thereof. Frame buffer 1100 can be thought of as a sequence of areas, for example 1101-1104, that are in some state of containing obfuscated data and valid data. As the SEDD moves through the frame buffer 1100, it progresses through the areas in groups of three, so that, at any one point in time there is an area 1103 that contains valid data being copied-out for display, an area 1102 (just prior to 1103) that contains data in the process of being de-obfuscated, and an area 1104 (just after 1103) that contains data that is in the process of being re-obfuscated. One skilled in the art will recognize that process/thread scheduling locks still should be asserted and relinquished as appropriate for the area in which valid data is present, for example 1103, in order to achieve greater security. Alternatively, since variation of parameters such as the location and the size of the areas may be changed, the state of the frame buffer may be sufficiently unpredictable to outside code.

FIGS. 12-17 describe an example embodiment of how portions of a SEDD accomplish the scheduling of content in the frame buffer to implement secure regions on a display device. For the purposes of example, the scheduling scenario as described with reference to FIG. 10 is used. Also, in the following description, numerous specific details are set forth, such as data formats and code sequences, etc., in order to provide a thorough understanding of the techniques. One skilled in the art will recognize, however, that embodiments of the present invention also can be practiced without some of the specific details described herein, or with other specific details, such as changes with respect to the ordering of the code flow, how the code flow is organized by function, etc. In addition, although certain parameters may be described as input and output parameters, fewer or greater or different parameters may be incorporated, depending upon the specific implementation.

In summary, at typically an application or operating system level, a request will be made to create a secure region on the display device and to render data into that region in a secure fashion. This request will be processed by the SEDD, which schedules the content of the frame buffer according to the scheduling plan (e.g., FIGS. 10 and 11) in effect and the obfuscation and de-obfuscation techniques being used.

Figure 12:
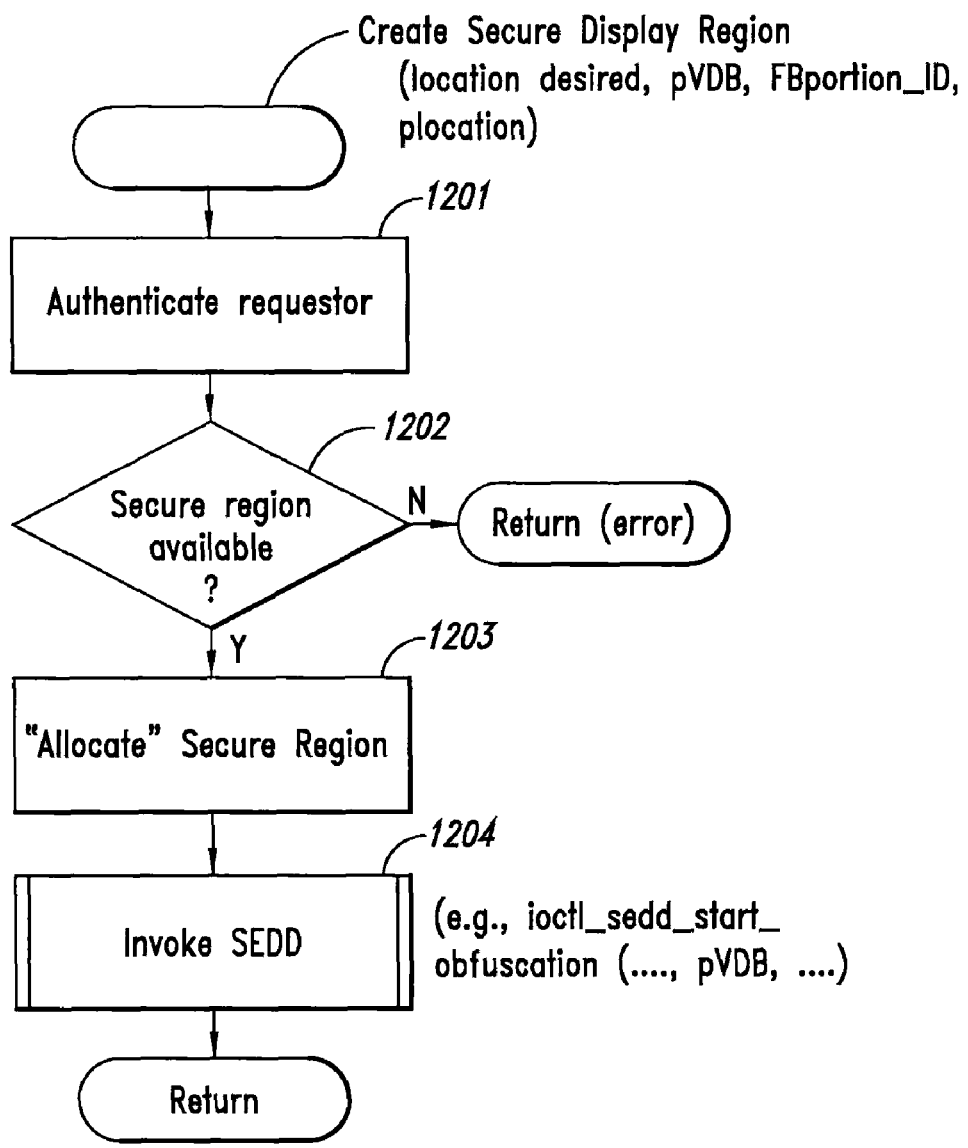
FIG. 12 is an example flow diagram of an example application level routine for requesting rendering in a secure display region.

FIG. 12 is an example flow diagram of an example application level routine for requesting rendering in a secure display region. The API (referred to as "CreateSecureDisplayRegion") takes as input a desired location and returns an indication of a secure area on the video card (e.g., a valid data buffer) for storing the valid data, an indicator of the secure FB location allocated, and an identifier to be used to identify this instance of a secure region. In step 1201, the API authenticates the requestor using, typically, standard techniques well known in the art, such as digital signatures, etc. In step 1202, the API determines whether the secure region being request is available, and, if so, continues in step 1204, or else returns an error. In one embodiment, secure regions cannot overlap (interfere) with FB locations in another secure region, in order to guarantee the integrity and correctness of the data being displayed. One skilled in the art will recognize, however, that other implementation are possible. In step 1203, the API allocates the secure region (by setting up the various return values for the requestor. The allocation step could also be done at the driver (SEDD) level instead. In step 1204, the API invokes the SEDD to start the obfuscation process on the allocated region and returns. In one embodiment, the driver is invoked through a standard device driver "ioctl" mechanism, which allows drivers to setup standard and special entry points.

Figure 13:
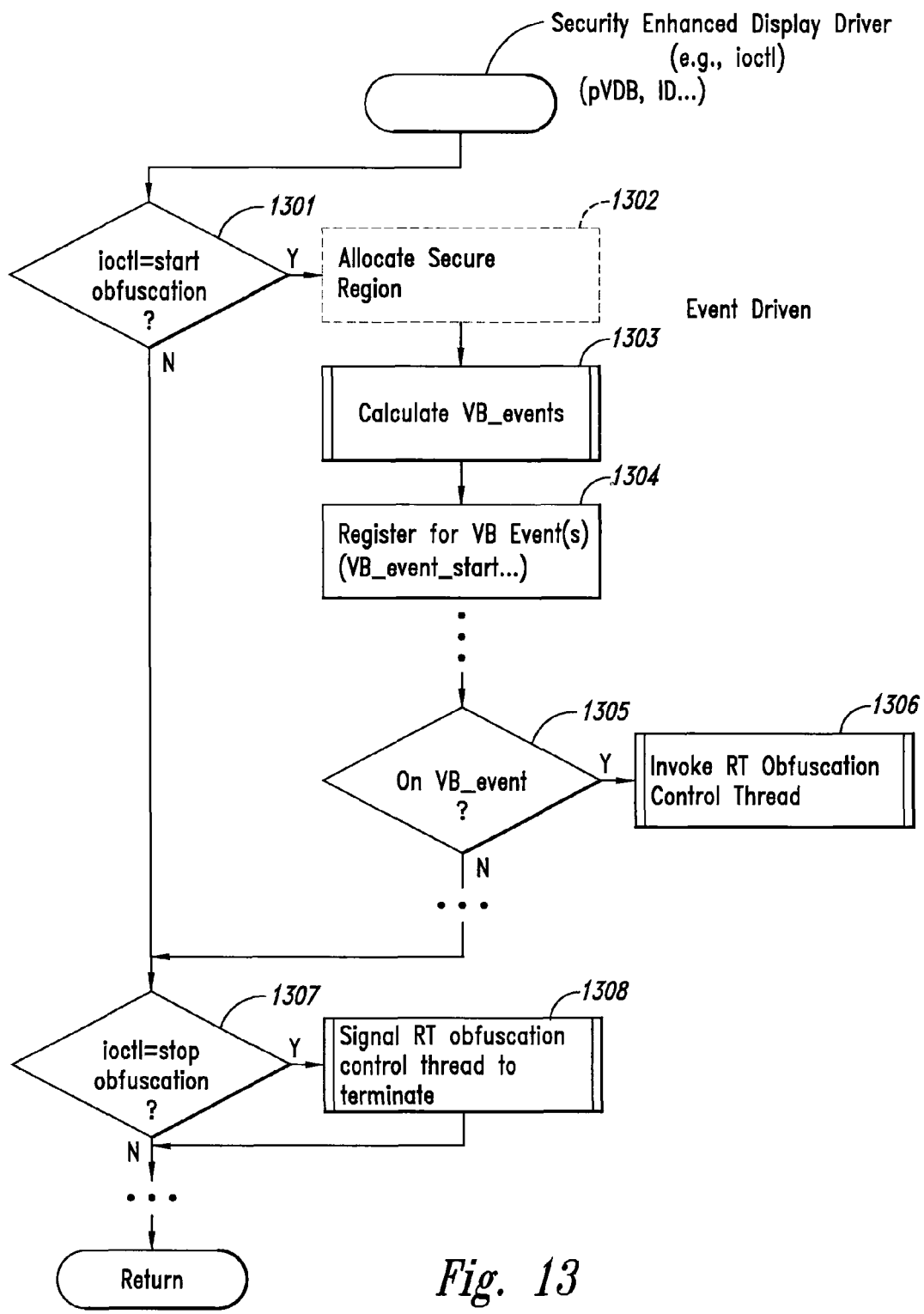
FIG. 13 is an example flow diagram of interfaces in an example Security Enhanced Display Driver to control obfuscation of a secure display region in a true multi-tasking, hardware event-driven system.
Figure 14:
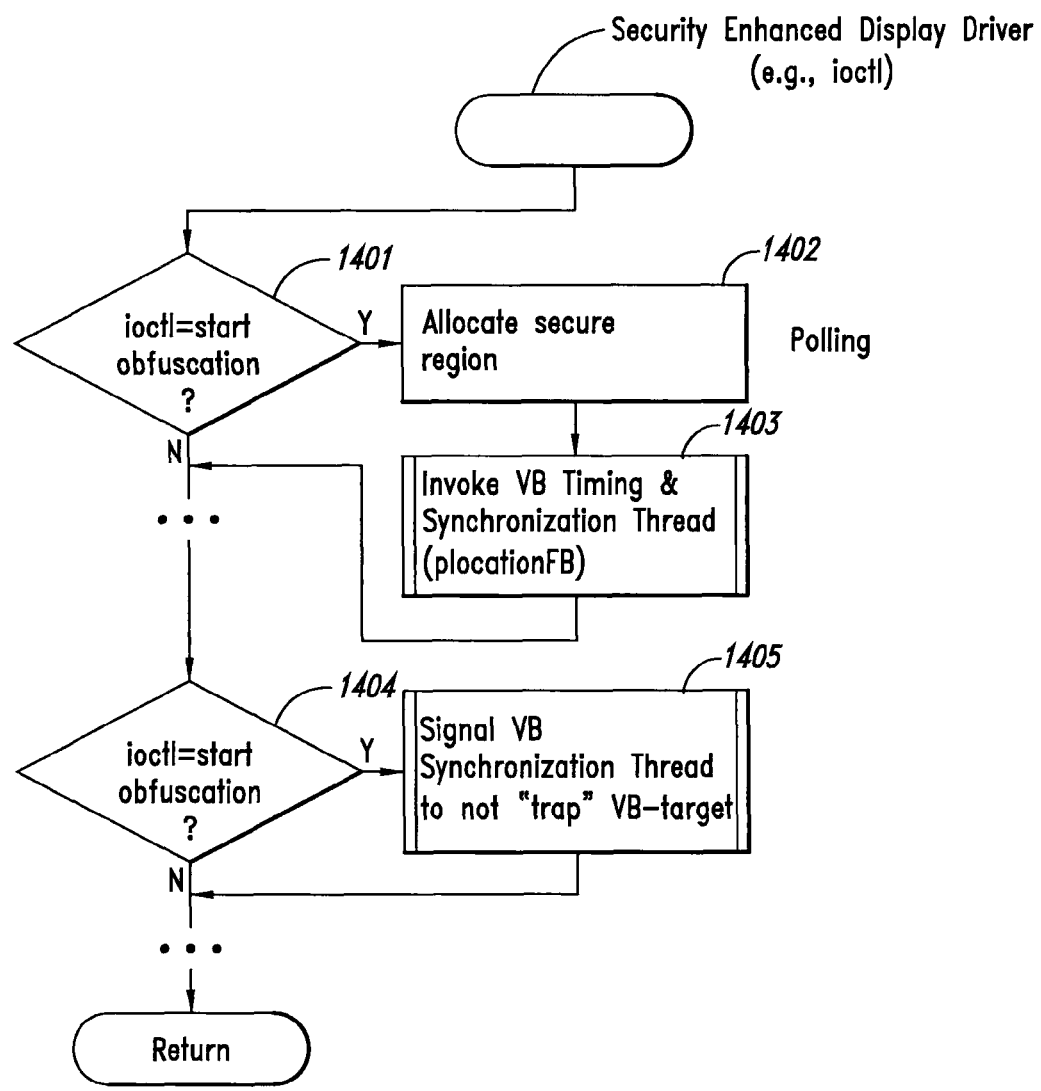
FIG. 14 is an example flow diagram of interfaces in an example Security Enhanced Display Driver to control obfuscation of a secure display region in a non-event driven manner in an alternate operating system environment.

Once the driver is invoked, a number of steps happen, which are dependent upon the operating system being used, especially what events (signals) can be received and what task (process/thread, or . . . ) locking mechanisms are available. FIGS. 13 and 14 are example embodiments of the ioctl entry point to start obfuscation based upon whether the system supports vertical blank (VB) event registration of whether a polling (spin-lock) technique needs to be used, respectively.

FIG. 13 is an example flow diagram of interfaces in an example Security Enhanced Display Driver to control obfuscation of a secure display region in a true multi-tasking, hardware event-driven system. In summary, the driver code determines where the projection gun needs to be in order to start obfuscation, registers for a VB event at that location in the frame buffer, and spawns a real time thread to de-obfuscate and re-obfuscate the secure portion when the VB event is received. Specifically, in step 1301, the code determines whether the driver has been invoked at the entry point corresponding to the "start obfuscation" process and, if so, continues in step 1302, else continues in step 1307. In step 1302, the driver code allocates a secure portion of the frame buffer to correspond to the secure region on the display, if this is not already done by the corresponding API. In step 1303, the code determines a VB_event_start location(time) in the frame buffer for starting the de-obfuscation process and a VB_event_end location(time) in the frame buffer for starting the re-obfuscation process—that is, a VB event specification that corresponds to the beginning location of the secure portion in the frame buffer adjusted for latencies, de-obfuscation, etc. (see Equation 1 above) and determines a VB event specification that corresponds to the end. A process for determining the VB_event_start and VB_event_end is described below with reference to FIG. 16. In step 1304, the driver code registers for a VB event at time VB_event_start and then waits to be signaled of this event. In steps 1305 and 1306, when the VB event is signaled, the driver code invokes a real time obfuscation control thread. After the thread returns, thereby relinquishing control to other tasks so that they too can paint the display, (or until the VB event occurs) the driver just waits until the next signal or ioctl. The real time obfuscation control thread is described in reference to FIG. 17.

Depending upon the particular implementation, an application (or the operating system) may explicitly stop the obfuscation process (thereby destroying the secure region) or may simply change the data being presented in the already allocated secure region, or some combination of both. The "stop obfuscation" ioctl entry point is an interface for stopping the obfuscation process of a particular secure region. In step 1307, if the ioctl received indicates a desire to "stop obfuscation" then in step 1308, the driver code signals the real time thread (if one is currently running) to terminate (and obfuscate the secure portion). If a separate "DestroySecureDisplayRegion API (not shown) is used to invoke the "stop obfuscation" ioctl, cleanup of the VDB and other related data should be performed by that API.

Although the examples are described primarily with respect to implementing driver code for one designated secure region, one skilled in the art will recognize that these techniques are extendible to multiple requestors and multiple secure regions using standard programming techniques such as look up tables or by invoking one real time obfuscation control thread (RTOC thread) per requestor, or using similar mechanisms. If multiple secure regions are being supported, then the driver code may register for a separate VB event for each secure region and spawn a RTOC thread for each, otherwise it may send a list of relevant VB events to the RTOC.

FIG. 14 is an example flow diagram of interfaces in an example Security Enhanced Display Driver to control obfuscation of a secure display region in a non-event driven manner in an alternate operating system environment. In summary, the driver code determines where the projection gun needs to be in order to start obfuscation, spin-locks on the VB signal+ the calculated VB_event_start time to determine when to start de-obfuscation of the secure portion of the frame buffer, and spawns the real time thread (same thread as for the approach used in FIG. 13) to de-obfuscate and re-obfuscate the secure portion. One skilled in the art will recognize that a locking approach with finer granularity may be used. In particular, a non-real time thread may be spawned first to perform any processing of the data required for de-obfuscating prior to copying the valid data into the FB. Thereafter, a real-time thread is spawned only to perform the copy-in of the valid data during the re-obfuscation process. (In other words, the real-time thread is used only for processing from approximately point A to point B in FIG. 10.)

Specifically, in step 1401, the driver code determines whether the driver has been invoked at the entry point corresponding to the "start obfuscation" process and, if so, continues in step 1403, else continues in step 1404. In step 1402, the driver code allocates a secure portion of the frame buffer to correspond to the secure region on the display, if this is not already done by the corresponding API. In step 1403, the driver code invokes a (non real-time) timing and synchronization thread to emulate the event handling to determine when the VB signal corresponds to the VB_event_start. Then, either the timing and synchronization thread invokes the real time obfuscation control thread directly, or it is done following step 1401 (approach not shown). The driver code then waits for the next signal or ioctl event. In step 1404, if the ioctl received indicates a desire to "stop obfuscation" then in step 1405, the driver code signals the real time thread (if one is currently running) to terminate (and obfuscate the secure portion). (Again, if a separate "API (not shown) is used to invoke the "stop obfuscation" ioctl, cleanup of the VDB and other related data should be performed by that API.)

Figure 15:
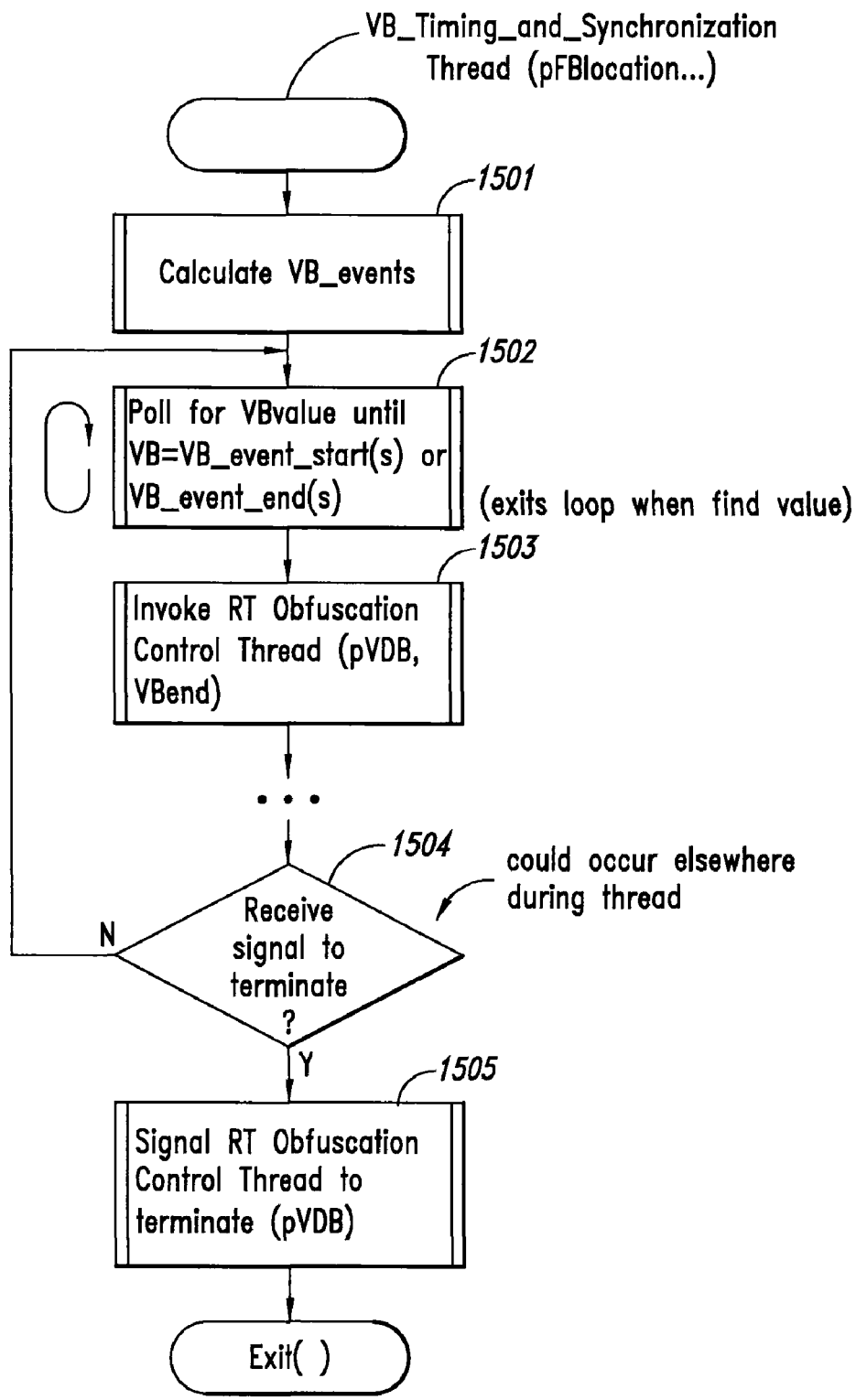
FIG. 15 is an example flow diagram of a vertical blank timing and synchronization thread used to control the frame buffer content scheduling in the alternate operating system environment of FIG. 14.

FIG. 15 is an example flow diagram of a vertical blank timing and synchronization thread used to control the frame buffer content scheduling in the alternate operating system environment of FIG. 14. This thread is called from step 1403 of FIG. 14. As stated, the primary purpose of this thread is to simulate what would otherwise be available from an operating system capable of signaling hardware events such as a specific timing/location for the VB signal plus some delta of time (or corresponding frame buffer location). In step 1501, the timing and synchronization thread (TS thread) determines a VB_event_start location(time) in the frame buffer for starting the de-obfuscation process and a VB_event_end location (time) in the frame buffer for starting the re-obfuscation process—that is, a VB (here simulated) "event" specification that corresponds to the beginning location of the secure portion in the frame buffer adjusted for latencies, de-obfuscation, etc. (see Equation 1 above) and determines a VB "event" specification that corresponds to the end. A process for determining the VB_event_start and VB_event_end is described below with reference to FIG. 16. In step 1502, the TS thread spin-locks (polls and waits) on the determined VB_event_start, and when it hits it, then in step 1503 invokes the real time obfuscation control thread (RTOC thread). A spin-lock can be achieved by polling for the VB signal and setting a timer to go off at time VB+VB_event_start (or other equivalent mechanism). The real time obfuscation control thread is described in reference to FIG. 17. After the RTOC thread returns, thereby relinquishing control to other tasks so that they too can paint the display, the TS thread begins another spin-lock process in step 1502 to poll and wait for the timing of the next VB_event_start. If multiple secure regions are being supported, then the TS thread may be simulating a separate VB event for each secure region. At some point, the TS thread may receive a signal to "terminate" (see representative step 1504) and when it does, then in step 1505, the TS thread signals the RTOC thread to terminate (and re-obfuscate any secure portions of the frame buffer).

Figure 16:
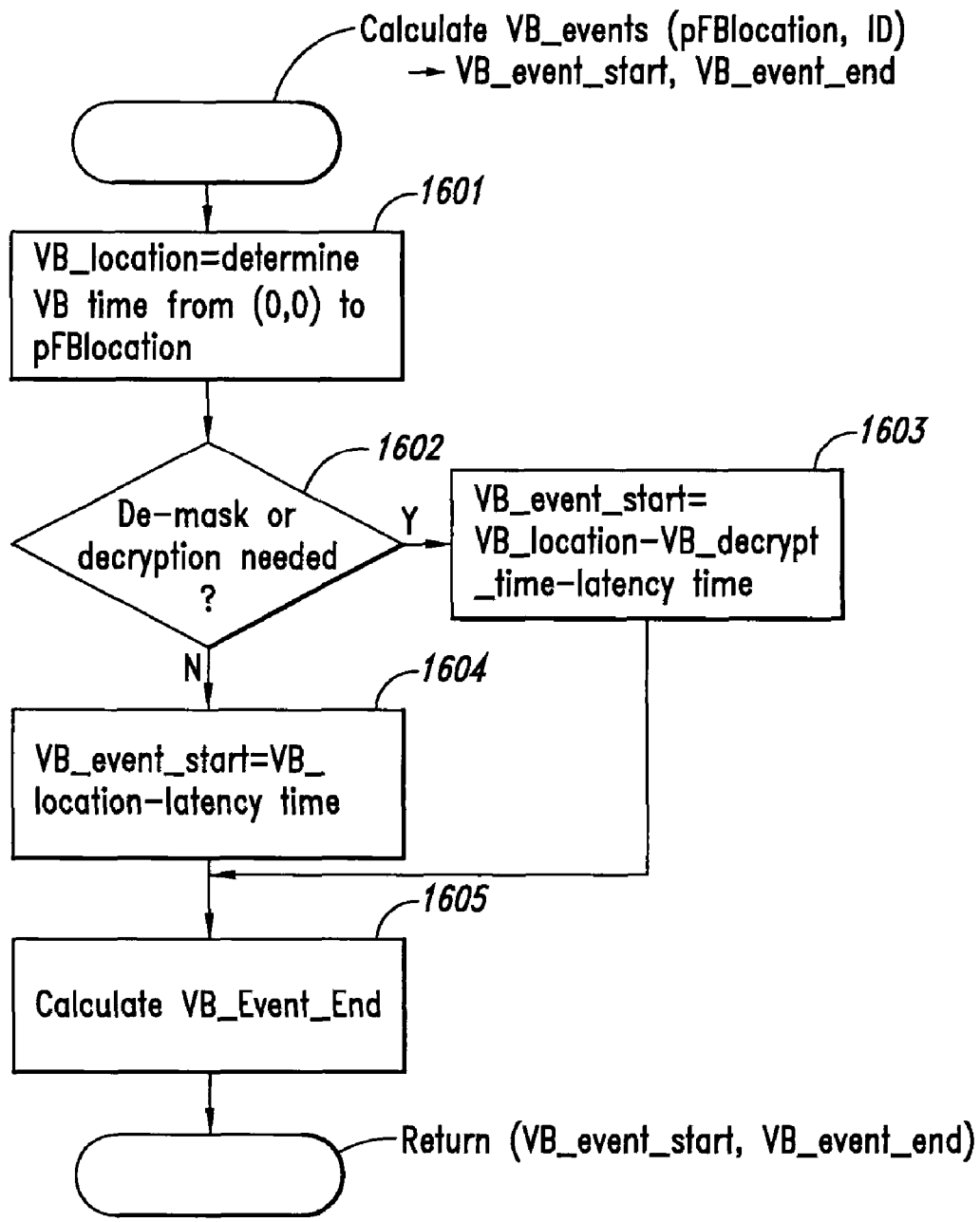
FIG. 16 is an example flow diagram of code for determining correlations between vertical blank and VRAM address as used to control frame buffer content scheduling.

FIG. 16 is an example flow diagram of code for determining correlations between vertical blank and VRAM address as used to control frame buffer content scheduling. As mentioned, the technique used is system dependent, but the general idea is to determine at what point in time the VB signal is occurring (at the rightmost bottom corner of the display, how long it then takes to get to VB_event_start, the point at which de-obfuscation should start (see point A in FIG. 10), and how long it the takes to get to VB_event_end, the point at which re-obfuscation should start. (The re-obfuscation point may begin sooner depending upon the technique used as described earlier—pixel, scan line, or block at a time.) In step 1601, the code determines the time by which de-obfuscation needs to have finished for a particular secure region (point A in FIG. 10). For example, this time can be computed knowing the scan rate (e.g., 80 mhz) and the number of scan lines to figure out the rate per scan line and then figuring out the scan line position that corresponds to the start of the secure portion of the frame buffer. In step 1602, if decryption (or de-masking) is used in the de-obfuscation technique in used, then the code continues in step 1603 to compute the VB_event_start taking into account extra time necessary for decryption (or de-masking). Otherwise, then in step 1604, VB_event_start is computed with system latencies, etc. As noted, these values need to be determined empirically, preferably during a system initialization process. In step 1605, the code determines VB_event_end by calculating the length of time needed to scan to the end of the secure portion and adding it to VB_event_start, or simple tracking it as a time difference.

Figure 17:
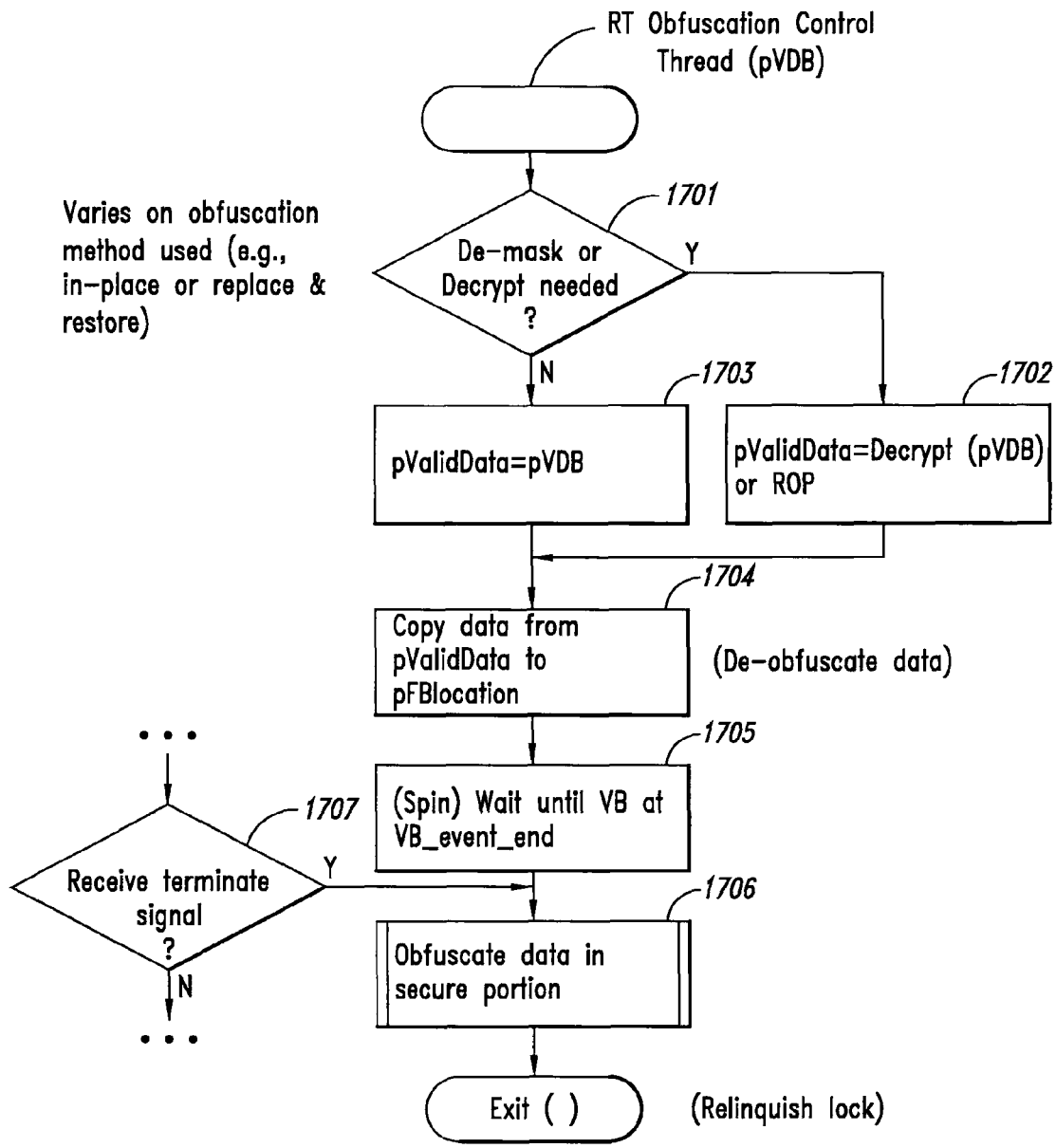
FIG. 17 is an example flow diagram of a real-time obfuscation control thread used by the Security Enhanced Display Driver to deliver valid and invalid data to the frame buffer.

FIG. 17 is an example flow diagram of a real-time obfuscation control thread used by the Security Enhanced Display Driver to deliver valid and invalid data to the frame buffer. The real-time obfuscation control thread (RTOC thread) used by the display driver to lock out other processes/tasks while the SEDD needs to display valid data. As noted, other equivalent process locking or resource (the frame buffer is a resource) locking mechanisms may be used, depending upon the operating system and hardware environment. It is intended in this embodiment that the RTOC thread be the highest priority task in the system at that point, so that all other processes/tasks are effectively locked out. Thus, the RTOC thread preferably acts very quickly and relinquishes control just as soon as the valid data is scanned and the secure portion re-obfuscated.

In step 1701, the RTOC thread determines whether decryption/de-masking is needed, and, if so, continues in step 1702, or else continues in step 1703. In step 1702, depending of course on the obfuscation technique being used by the SEDD, the RTOC thread creates valid data by decryption or de-masking and sets an indicator to this value (pValidData). In step 1703, since valid data is already available, the RTOC thread just uses the valid data stored, for example, in the VDB. In step 1704, the RTOC thread copies in the indicated valid data to the secure portion of the frame buffer. In step 1705, the RTOC thread waits (if time not already passed) until VB_event_end and then in step 1706 re-obfuscates the secure portion of the frame buffer by whatever obfuscation technique is being used. (See, for example, FIGS. 8-9.) At some point (indeterminate) within the processing of the RTOC thread, the thread may receive a signal to terminate obfuscation. When it does, the RTOC preferably executes step 1706 to make sure that the secure portion of the frame buffer contains obfuscated data.

Secure Storage and Display of Keyboard, Mouse and Other Pointing Device Input

Figure 18:
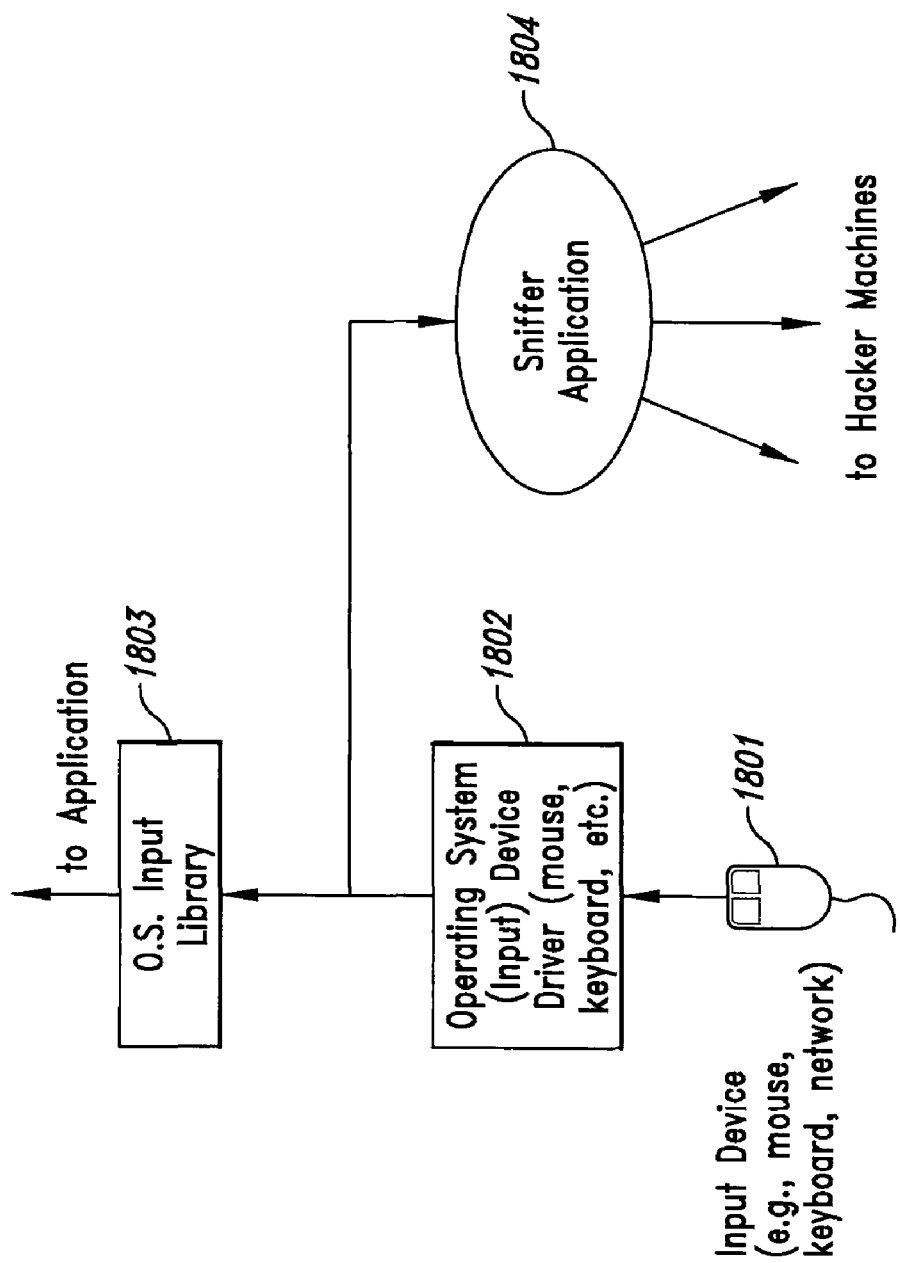
FIG. 18 is an example block diagram that illustrates how input data hacking occurs.

FIG. 18 is an example block diagram that illustrates how input data hacking occurs. The diagram is meant to address all types of input, for example, keyboard, mouse, and other pointing device input. In FIG. 18, as input is sent from the input device 1801 to an appropriate operating system device driver 1802 it is processed by an appropriate input "stack"

(code designed to handle and pass the input). As part of being processed by the input stack, the input is forwarded to input routines provided, typically, by an application input library 1803, in order to send the input to a requesting application. The input data, while transient, is vulnerable to sniffer applications 1804, which watch the data to capture data and/or look for patterns in the input.

Figure 19:
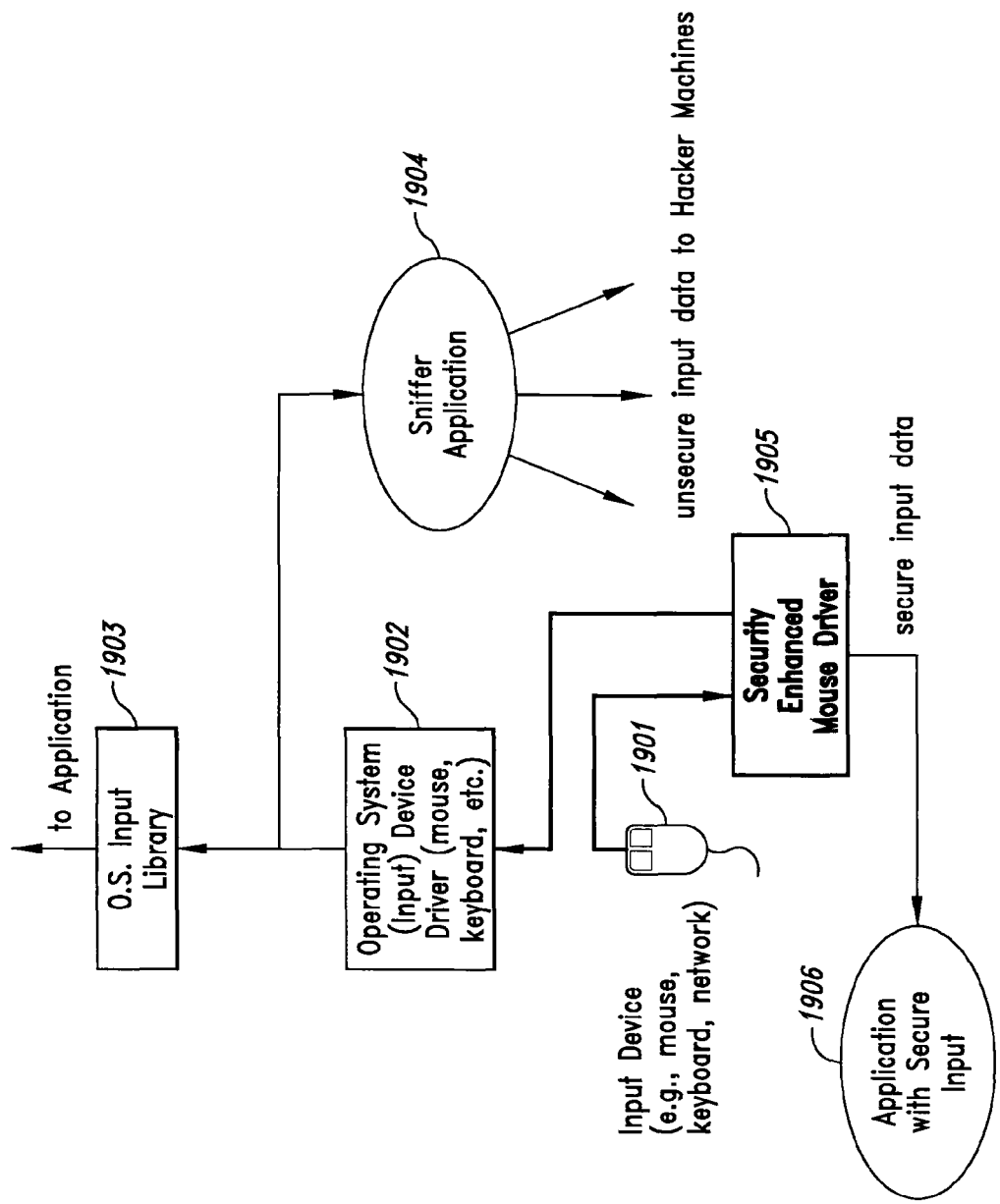
FIG. 19 is an example block diagram of the general techniques used by a security enhanced input driver, such as a Security Enhanced Mouse Driver to prevent unauthorized access to input data.

FIG. 19 is an example block diagram of the general techniques used by a security enhanced input driver, such as a Security Enhanced Mouse Driver to prevent unauthorized access to input data. The diagram shows the same components as shown in FIG. 18, but with an additional component, the Security Enhanced Mouse Driver (the SEMD) 1905. The SEMD is a secure driver, which is invoked by applications or other code 1906 desiring to provide secure input. The SEMD is preferably installed first-in-line so that it hooks the input first from the hardware, before other components, including the operating system drivers have a chance to intercept the input. A detailed description of how a driver is installed as a first-in-line driver and monitoring mechanisms for ensuring that the driver remains secure in its position are described below with reference to FIG. 23 and related text. In summary, the SEMD (or other secure input driver) intercepts the data from the input device, determines whether it has been requested by an authorized application that requested secure input (such as application 1906), and if so, sends the input in a secure fashion to the authorized application, otherwise forwards the input on to the standard operating system drivers.

Figure 20:
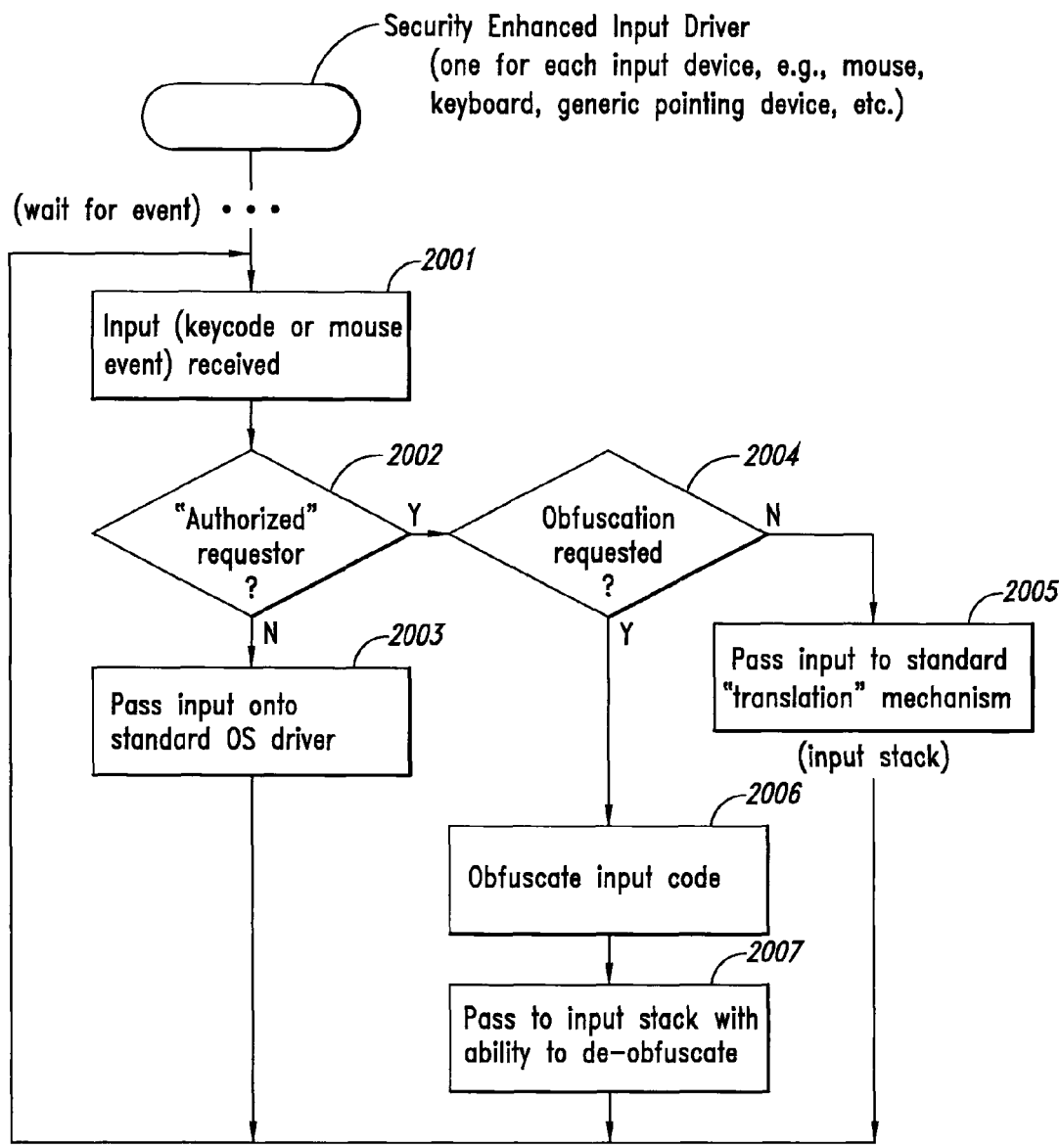
FIG. 20 is an example flow diagram of the obfuscation techniques used by an example Security Enhanced Keyboard Driver to prevent unauthorized access to input data.

FIG. 20 is an example flow diagram of the obfuscation techniques used by an example security enhanced input driver to prevent unauthorized access to input data. In FIG. 20, the input driver, for example, a mouse or keyboard driver, waits (typically at the request of an application or the operating system as a result of a "read" request) until the next input event. In step 2001, when such an event is received, the driver continues in step 2002 to determine whether an "security authorized" requestor has issued the read request, and, if so, continues in step 2004, or else continues in step 2003. For the purposes described herein, a security authorize requestor is preferably an application or other code that has specifically notified the secure input driver that secure input is desired. Standard authentication mechanisms can be used to authenticate the requestor after the requestor has initially registered with the secure input driver. In step 2003, the driver code determines whether the authorized requestor has also specified that it desires obfuscated input (to generate an added measure of security), and, if so, continues in step 2006, else continues in step 2005. In step 2005, the input is then passed to the input "translation" stack offered by the secure driver or libraries that handle the secure input in order to forward the input to the security authorized requestor. The input translation stack typically determines, for example for keyboard input, a character, from a key code. In step 2006, when obfuscation has been requested, the input driver obfuscates the input code, using whatever obfuscation technique is implemented or specified. For example, the input code can be encrypted, combined by Boolean operations with a mask, such as noise, a pattern, etc., much the same way display output can be obfuscated. In step 2007, the secure input driver code passes the obfuscated input code to an input translation stack that is coded to de-obfuscate the input code using the reverse technique to that which was used to obfuscate the input code.

Secure Storage and Display of Audio Content

Figure 21:
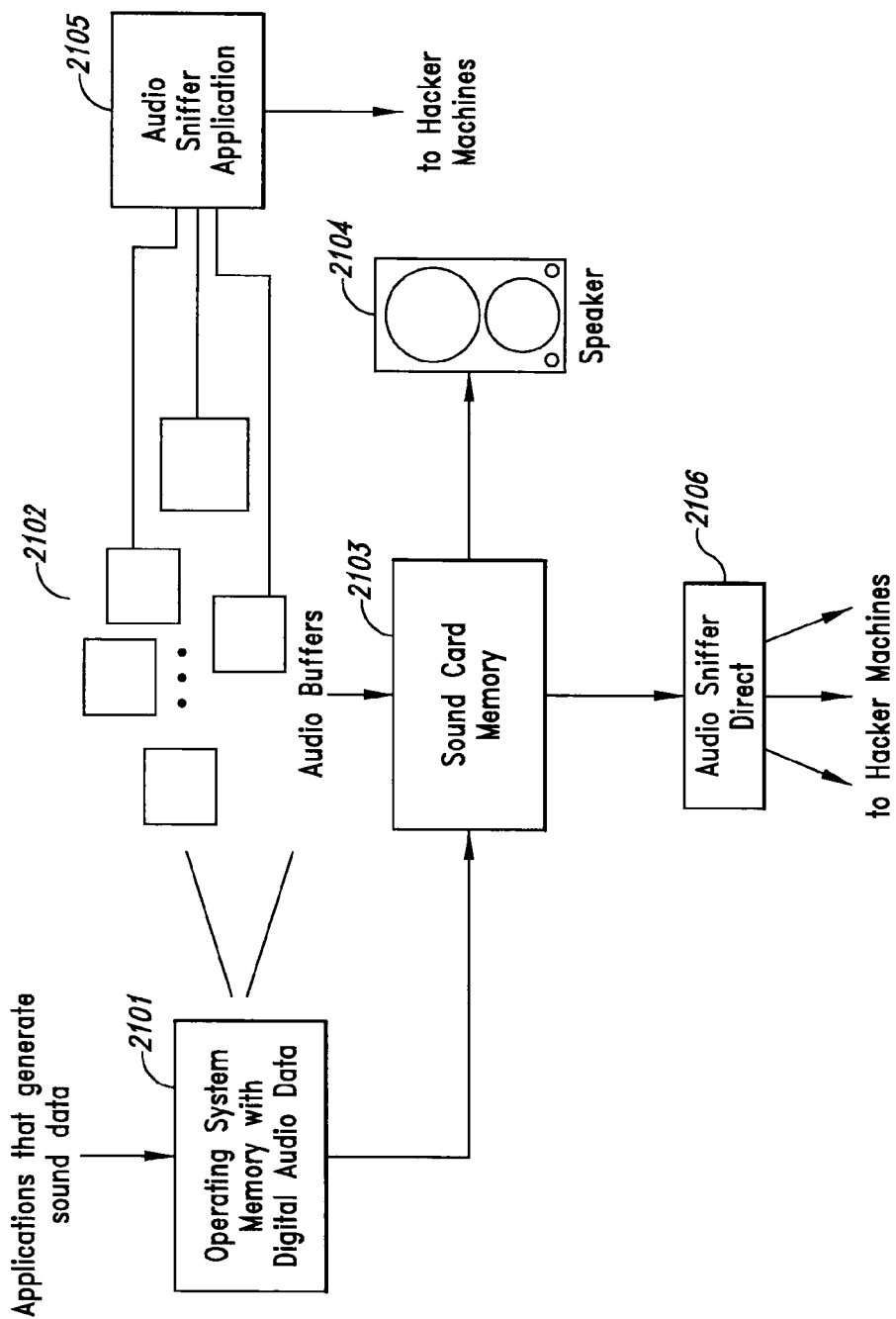
FIG. 21 is an example block diagram that illustrates how audio data hacking occurs.

FIG. 21 is an example block diagram that illustrates how audio data hacking occurs. As audio is sent from the operating system memory 2101 or to memory on a sound card 2103 for playback on a speaker 2104, the audio data is vulnerable while it is being stored on the sound card memory 2103 to malicious code, such as sniffer application 2106. In addition, for applications that handle streaming audio, the operating system (or other application libraries) buffers audio temporarily in audio buffers 2102. The buffered audio data 202 is also vulnerable to hacking such as by unauthorized sniffer applications 2205.

Figure 22:
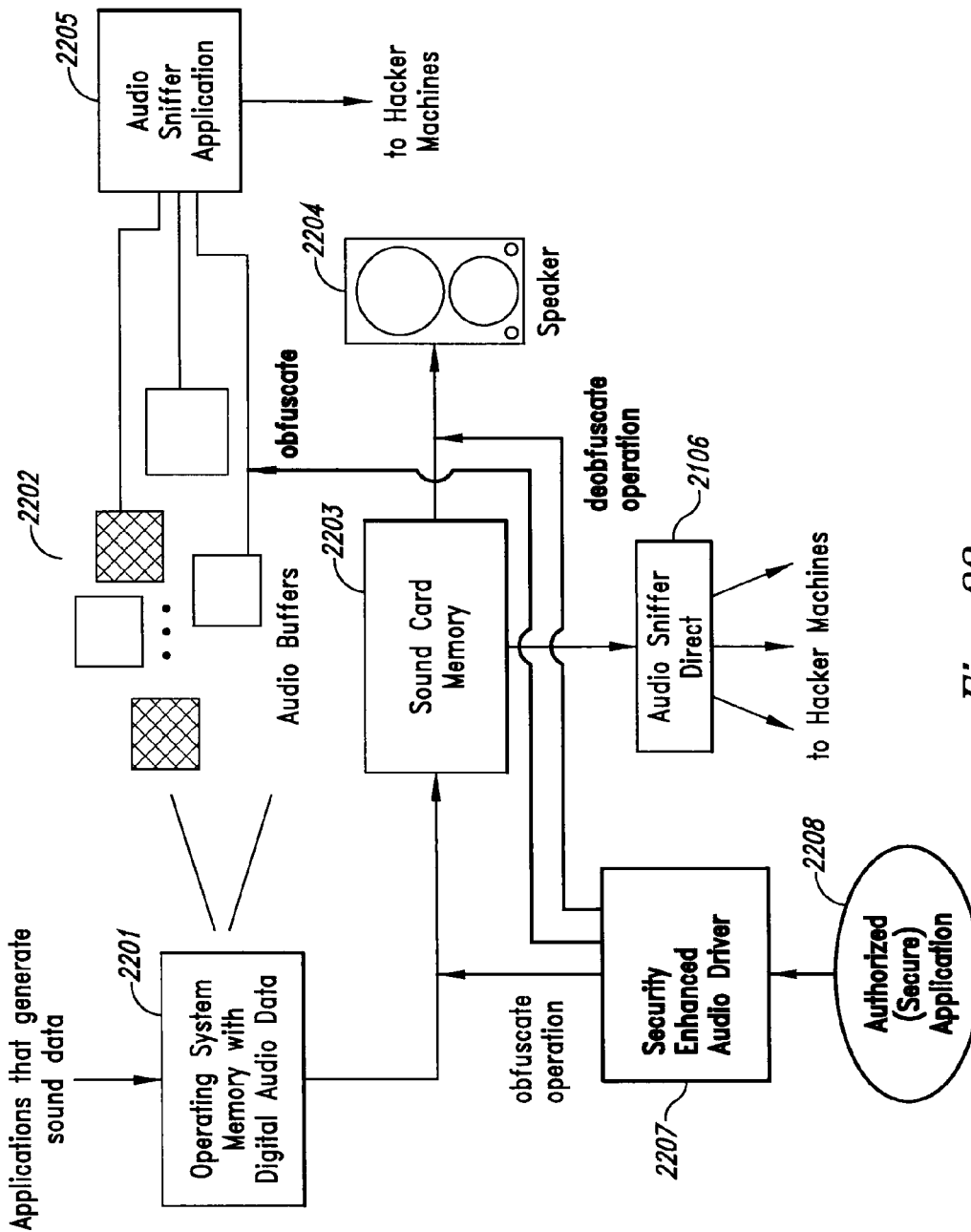
FIG. 22 is an example flow diagram of the obfuscation techniques used by an example Security Enhanced Audio Driver to prevent unauthorized access to audio data.

FIG. 22 is an example flow diagram of the obfuscation techniques used by an example Security Enhanced Audio Driver to prevent unauthorized access to audio data. The diagram shows the same components as shown in FIG. 21, but with an additional component, the Security Enhanced Audio Driver (the SEAD) 2207. The SEAD is a secure driver, which is invoked by authorized applications or other code 2208 desiring to provide secure audio output.

In one embodiment, the SEAD obfuscates the content of the pool of audio buffers 2202 by selecting in a SEAD specific manner, which buffers to use for sequencing the audio. For example, a random or pseudo-random sequence of numbers can be used to select which buffers to use to accumulate the digital form of the audio signal. To confound attempts to track utilization of the buffers, distracter information is placed into the buffers that are not being used. As the audio is passed in digital form to the next software component, if the component is authorized to use the SEAD for obscuring audio, then the audio is extracted from the audio buffers 2202 using the same random or pseudo-random sequence of numbers to determine the appropriate source buffers. When the audio is no longer required, the buffer is returned to the pool of available buffers or optionally, has distracter information placed in it.

The SEAD also can be implemented to obfuscate the audio data sent to the card by, for example, performing some operation "F" on the audio to encrypt or somehow encode or mask the data. (Operation "F" is soundcard dependent, and like other forms of encryption, has a counterpart reverse operation for decryption purposes.) When the audio is presented by the SEAD to the soundcard for conversion to the analog audio signal, SEAD instructs additional software on the soundcard, for example a DSP present on certain soundcards, to perform the de-obfuscation. This may be achieved on certain soundcards by creating an equalizer and sound processor code and treating the de-obfuscator codes in a manner similar to reverb, symphony hall, or other special effects.

In addition, when the SEAD is receiving a stream of audio information or the receiving security authorized software is forwarding a stream of audio information to the SEAD, the digital representation of the digital audio information may be pre-obfuscated or encrypted, in a secure driver specific manner, such that the SEAD can decrypt the audio in a safe manner. For example, the format of the may be encoded, or transcoded into the form acceptable for use by that system. The origins of the audio stream are derived from a conventional source, such as MP3 files or streams, streaming servers, or other encoded digital audio sources. The receiving secure software, that knows how to decrypt these encoded audio sources then renders the audio stream into the SEAD's internal obfuscation format such that plain "text" of the audio is never present in the system in digital form.

First-in-line SED Installation and Watchdog Monitoring

The ability to control when a driver has access to input and/or output is especially important to security enhanced drivers. Each operating system provides mechanisms for ensuring that a particular driver has access before all other drivers, or before all of the drivers of its type (for example, hard disk drivers), depending upon the operating system. In operating systems similar to Windows 9x operating systems, event processing is performed in a "chain," and drivers can be installed in various parts of the chain depending upon when they are loaded into the system.

For example, input event processing for Windows 9× operating systems proceeds typically as follows:

A hardware event occurs: mouse or keyboard activity (mouse movement or key presses).

A VxD style (virtual) device driver (or system level driver) detects and reads input from hardware and sends event to hardware virtualization layer.

The virtualization layer successively sends the driver event input to the list of device handlers registered for those events; allowing each device handler function to process the data or return without processing, allowing the next device handler in the chain to process the data.

Driver events may be processed by the handler or sent on to the application which registered for them.

Figure 23:
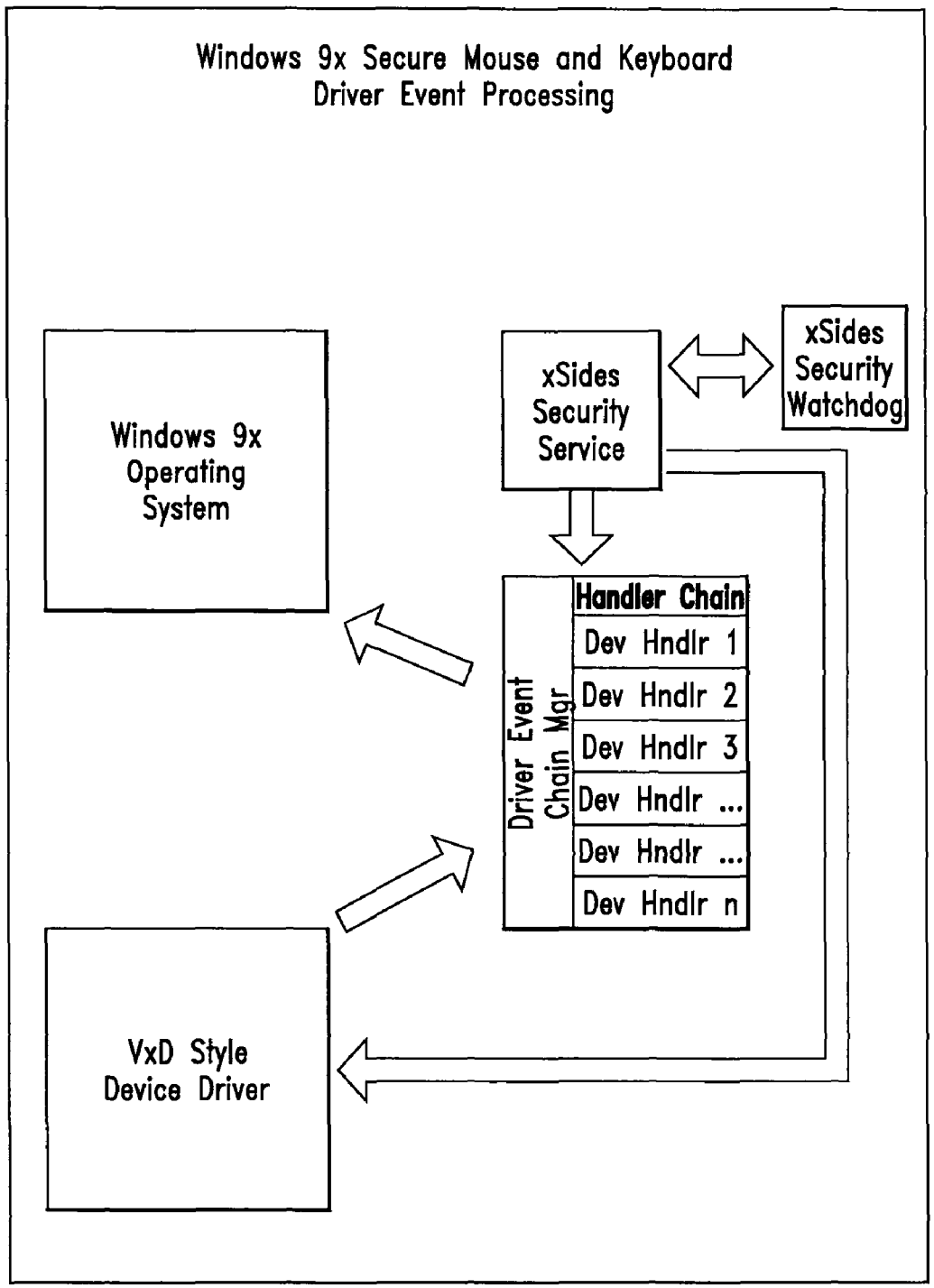
FIG. 23 is an example block diagram of installing a security enhanced driver as a first-in-line driver in Windows 9× operating system environments and associated monitoring processes.

Techniques of the present invention, when used in conjunction with Windows 9× operating systems, ensure that (especially) input SEDs are optimally secure by installing the relevant drivers as the top (first) event handler in the handler chain for each input device. In addition, a watchdog process is invoked, as described further below to periodically validate the handler position. FIG. 23 is an example block diagram of installing a SED as a first-in-line driver in Windows 9× operating system environments and associated monitoring processes.

In Windows NT and derivative operating systems, input event processing follows a different model. For example, input event processing in these systems proceeds typically as follows:

A Hardware Interrupt Service Routine (ISR) works fast to collect data, building IRP I/O Request Packet The ISR feeds into a Mini Port, which contains the hardware interface and knowledge of the device.

Data is abstracted and passed up further to the Port Driver. The port driver (usually 1 per I/O device). The port driver abstracts the process further and does more processing on the IRP Data is then passed up to the Class Driver. Examples of this can be mouse class and kbdclass. These are the standard mouse and keyboard classes for the Windows Operating System.

Above the class drivers are the filter drivers, the filter drivers can become the first to receive input and then determine to pass it onto the existing system or not.

For example in Microsoft Windows OS a kernel driver can add itself into the upper filter key of the registry to note that it wants to receive key events.

Using the sequence as outlined above for NT OS I/O loading and processing, in one embodiment, a SED can be created as a class driver. The SED would then place a value in the upper filter of the registry to denote itself having input focus within the OS system. In this embodiment, the SED needs to ensure that it is the first filter in the registry along with ensuring that is the first of the filter drivers to receive the I/O Request Packet directly from the class driver.

The concepts for implementing a watchdog service to monitor security in both the Windows 9× and NT are similar, however the implementation varies to adhere to the driver model of each operating system. By inserting a SED's filtering (and potentially obfuscating) function as the first function to examine and/or process the driver's event data, SEDs ensure the validity and security of the mouse, keyboard, and other input devices; either processing the data for the secure environment or allowing the data to be returned to the operating system via the normal mechanism. One skilled in the art will recognize that similar techniques can be developed in other operating system environments, as long as the driver model is known and an SED filtering function can be appropriately inserted.

One skilled in the art will also recognize that no distinction is made between the mouse and keyboard devices for the purposes of using these techniques. The device drivers both operate in a similar manner for the purposes of this description. In addition, these techniques may be implemented with a trackball, a digitized tablet, a cordless keyboard, a cordless mouse, a numeric keypad, a touch pad, or any other pointer or key-based input device.

In an example Windows 9× implementation, a SED security service is installed which acts as a timer. Upon startup, the SED security service establishes a communications path to the SED driver using a standard mechanism, IOCTL( ). Via the IOCTL path, the SED security service signals the SED to verify that the SED is in the first (top) device handler position in the event processing handler chain of the mouse and keyboard. If this is not the case, the SED attempts to re-register the SED handler into the first position. If this attempt fails an error message is registered and the system is now considered to be unsecure for obfuscation purposes.

Upon detection of an unsecure environment, an event, for example, a application-specific event, is propagated through the environment, to inform all relevant applications. For example, in the xSides environment, described in detail in U.S. patent application Ser. No. 09/726,202, entitled "Method and System for Controlling a Complementary User Interface on a Display Surface," filed on Nov. 28, 2000, an xSides event is prorated throughout, informing all xSides applications that rely on secure input functionality that those devices (e.g., mouse and keyboard devices) are no longer considered secure. This change of security is communicated preferably to the user as well via an icon which is displayed in a secure region (as described above in the section entitled "Secure Storage and Display of Video Content." Common bimaps used for this purpose are a locked or unlocked padlock.

To ensure that continuous security validation checks occur by the security service, a second service is started up to act as a watchdog to the SED security service called the SED security watchdog. The purpose of the security watchdog is to establish a bi-directional communications path to the security service on which messages are sent to and from the two services. These messages act as an "I'm alive" or ping mechanism, which informs each service that the other is functioning normally. If one service fails to receive a message from the other in some arbitrary time period, an attempt by the receiving service will be made to restart the other service.

If the receiving service is unable to restart the other service, then the system, for obfuscation purposes, is considered unsecure and the same notification to the user is performed as described above for the security service.

The security service for Windows NT derivative operating systems is essentially the same as for the Windows 9× version. One difference is that the value being verified is not a handler chain, but instead the value of the callback function pointer in the I/O completion structures for the input devices (e.g., mouse and keyboard). This is done by a comparison of the function pointers. If the SED callback function is not the callback function pointed to in the I/O completion structure, an attempt to replace it will be made. The failure modes described for Windows 9× for failing to change the function pointer for the callback function to the SED version are also preferably available for the Windows NT technique; i.e., secure/un-secure notification.

The basic SED security watchdog service operates similarly in the Windows NT environment as in the Window 9x environment.

An additional watchdog service (or an extension of the existing service) may be made available to verify the status of hooks, and verify that the SEDs have not been tampered with. An NT implementation includes two separate processes that registers an interest in two different system registry entries. If they are not in sync, the watchdog service notifies or automatically repairs registry entries that are not correct. The two registry entries have sufficient state to allow the watchdog executable to verify that the registry entries have not been tampered with. This may be, for example, the storing of the checksum, certificates, or the signature of the application in the registry entries of the watchdog itself, along with an XOR of the signature and another known value, or alternatively a signature derived by a different mechanism than the first. The watchdog is invoked if the registry entries are modified and verifies that the entries are correct at that time; and, if they are not correct, determines the correct values and replaces them. Since it is unlikely that (1) the signatures stored in the registry, (2) the watchdog itself, (3) the software the signatures were derived from, and (4) the software that verifies the watchdog itself can all be changed in a manner as to appear valid, this mechanism alone or in combination with other measures may be used to determine the state of intrusion or modification of the software codes.

Denoting Security in User Interfaces

Figure 24:
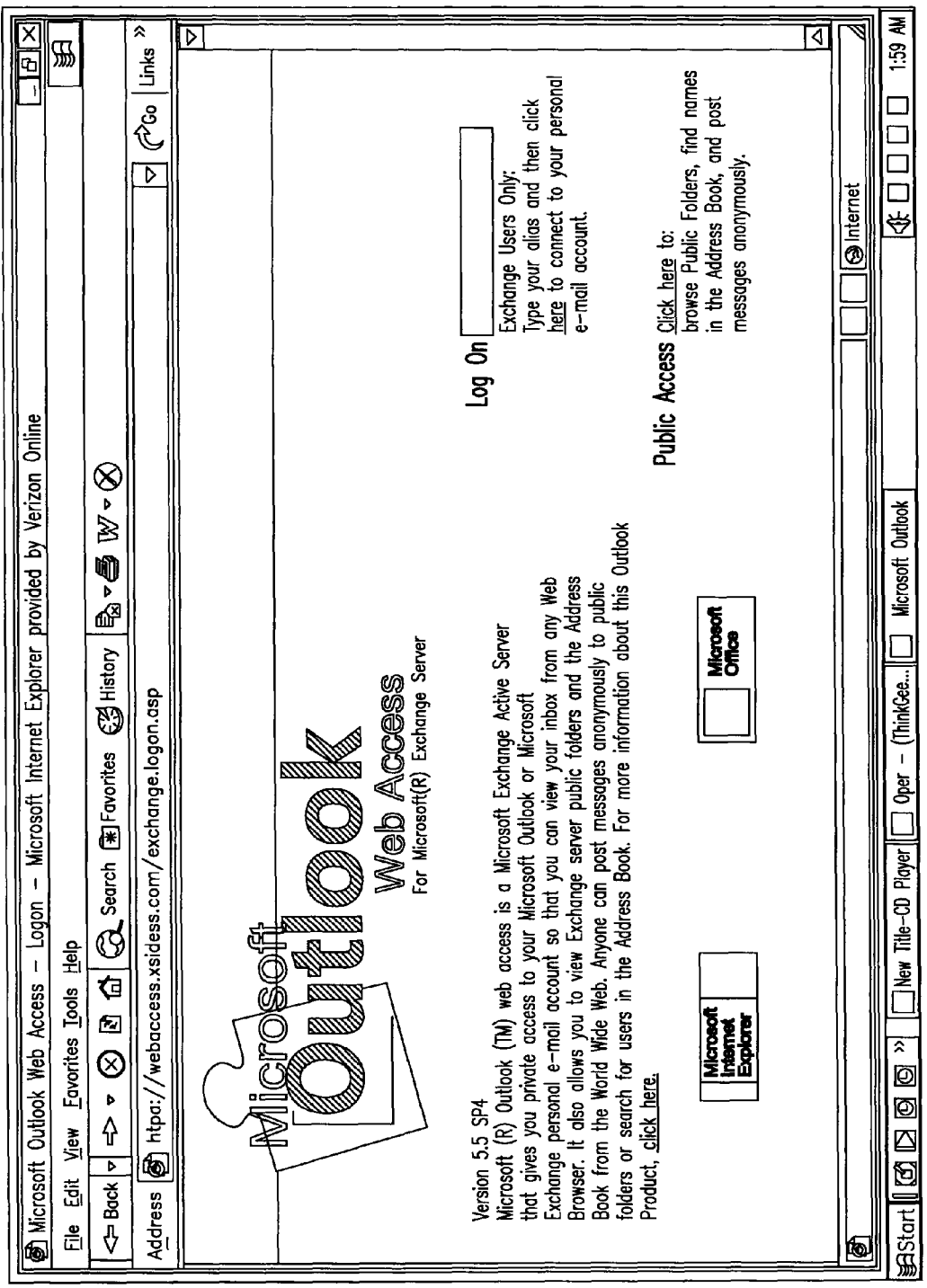
FIG. 24 is an example screen display that illustrates a padlock to denote security as used in an existing software application.

As mentioned, to complement the obfuscation techniques and security enhanced drivers, the methods and systems of the present invention also provide different techniques for denoting various levels of security in the system. Some existing systems, such as applications like a web browser, provide a basic graphical representation of security or security-level. Microsoft's Internet Explorer for example, uses a representation of a "padlock" located in the bottom status bar region of the browser to represent to the user that a web site location is currently using secure or non-secure communication protocols, usually in the form of technologies such as SSL or HTTPS. FIG. 24 is an example screen display that illustrates a padlock to denote security as used in an existing software application.

The security enhanced drivers of the present invention provide a mechanism by which a secure region on the display device, such as a displayed desktop, window, or an alternative display area may use the display cursor to intuitively identify to the user the security level of the region. Specifically, each secure region is associated with an attribute value that causes the display cursor to inherit a color value for the level of security associated with the specific region. As the cursor is moved, whether automatically or by the user, from one display area into another display area with a higher or lower security level, the cursor color and/or representation can change to an appropriate value. For example, as a user moves the cursor from within a non-secure Windows desktop display area into the alternative display area created by a alternative-display technology such as that developed by xSides Corporation, the cursor color may change from white to red or it may change from the standard Windows arrow cursor into a gold-key representation.

Similarly, this denotation mechanism can be used in an environment where multiple secure (or unsecure) regions are displayed on a display device, each with different inherent capabilities or security values. The security values associated with each region are queried using a mechanism such as the standard Microsoft Windows API routine, SetCursor( ). The return value of the SetCursor( ) routine contains the information necessary for application to identify the security level associated with the specific region.

Figure 25:
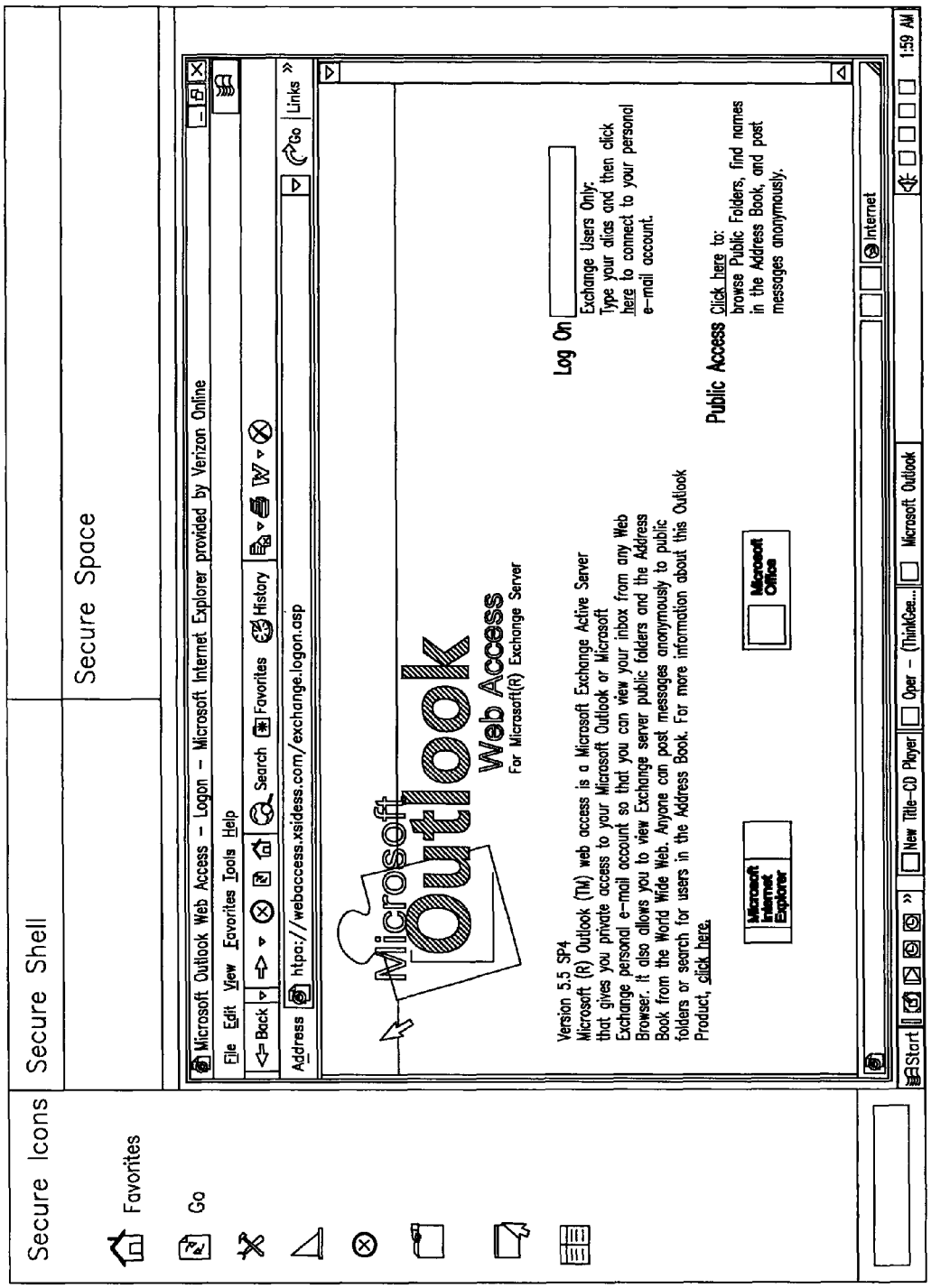
FIG. 25 is an example screen display that illustrates use of the cursor to determine a security level and other representations on windows used to denote security.

This denotation mechanism is not limited to using a cursor as a means of security representation. One skilled in the art will recognize that other components of the desktop display or regions within or outside the desktop display can reflect the security level and capabilities to the user. If a secure desktop is loaded it can contain attributes that allow the end-user to distinguish its security level through a visible or auditory alteration to the windows of the secure desktop. For example, a secure desktop may have a lock or key associated with it and blended into a corner of the desktop display. The desktop might also take a different gradient of color when associated with a different security level. A window, an alternative display, or an arbitrary secure region may contain a colored border, which is associated with the security level. Or, for example, the surrounding border may change width, pattern, or even look like a chain, depending the security level of the window, alternative display, or secure region. Other implementations regarding the alteration or additions to the window, display, or region may optionally be used, such as placing additional decoration above the area, a diagonal striped black and yellow bar for example, or other placement in immediate proximity to the area, or within the area itself. Another alternative is to change the appearance of a standard user interface element decoration, such as a scroll bar, to an alternative form, pattern, color, or any combination of these. In addition, or in combination with the above variations, changes to the Title Bar, caption, or navigation icon may also be used to denote the level of security provided by the associated software of a particular window or region. These changes may be as simple as rendering the title bar caption in a different color set, or denoting a number or other symbol over the navigation icon of the window. FIG. 25 is an example screen display that illustrates use of the cursor to determine a security level and other representations on windows used to denote security. One skilled in the art will recognize that other similar techniques may be incorporated.

In the event that security can be provided or assured through multiple "agencies" or instances of software, it may benefit the user to know the origin of the security assurance. The system preferably indicates the security level through any of the mechanisms described above, while providing either persistent text denoting the security provider in the title bar, above the title bar, in a status bar, or other relatively fixed location, or in a non-persistent manner, such as a pop-up display, "tool tip" display, or transient text display in some other portion of the window or secure region of the display device. This transient text display may be triggered periodically, or by some outside event such as entry into the security state or movement of the text or mouse cursor over the security icon.

All of the above U.S. patents, U.S. patent application publications, U.S. patent applications, foreign patents, foreign patent applications and non-patent publications referred to in this specification and/or listed in the Application Data Sheet, including but not limited to, U.S. Provisional Patent Application No. 60/297,273 entitled "Method and System for Maintaining Secure Data Input and Output," filed Jun. 8, 2001, U.S. patent application Ser. No. 09/726,202 entitled "Method and System for Controlling a Complementary User Interface on a Display Surface," filed Nov. 28, 2000, and U.S. Pat. Nos. 6,018,332, entitled "Overscan User Interface," issued on Jan. 25, 2000, and 6,330,010, entitled "Secondary User Interface," issued on Dec. 11, 2001, are incorporated herein by reference, in their entirety.

From the foregoing it will be appreciated that, although specific embodiments of the invention have been described herein for purposes of illustration, various modifications may be made without deviating from the spirit and scope of the invention. For example, one skilled in the art will recognize that the methods and systems for secure data input and output are applicable to other types of storage and input devices and to other types of data, streamed or otherwise, other than those explicitly described herein. For example, the obfuscation techniques used to obfuscate data within the frame buffer may be extended to obfuscate other types of storage. In addition such embodiments may be extended to provide a content scheduler for such storage using techniques similar to those described with respect to the security enhanced drivers described herein.

The invention claimed is:

1. A method in a computer system for providing a secure display area on a video display device of a video display system, the video display system having video display memory for storing data to be displayed on the video display device, comprising:
    reserving a portion of the video display memory for secure data storage that corresponds to the secure display area;
    receiving a request to display valid data in the secure display area;
    storing invalid data in the reserved portion of the video display memory until a determined period of time before the data stored in the reserved portion is transferred to the video display device for display, the valid data being an obfuscated form of the valid data; and
    at the determined period of time, deobfuscating the invalid data stored in the reserved portion of the video display memory wherein the determined period of time corresponds to a time required to deobfuscate the invalid data in the reserved portion of the video display memory and transfer the reserved portion to the video display device.

2. The method of claim 1, further comprising:
    after the data stored in the reserved portion is transferred to the video display, reobfuscating the data in the reserved portion of the video display memory.

3. The method of claim 1 wherein obfuscation is performed by at least one of encryption of the valid data and a raster operation applied to the valid data and a mask.

4. The method of claim 3 wherein the mask is a bitmap comprising at least one of an encryption key, a company logo, a pattern, an advertisement, and a black region.

5. A non-transitory computer-readable medium for providing a secure display area on a video display device of a video display system, the video display system having video display memory for storing data to be displayed on the video display device, the computer-readable medium containing instructions that, if executed, will cause a computer system to implement:
    a data receiver that is structured to receive a request to display valid data in the secure display area; and
    a video display memory scheduler that is structured to:
        reserve a portion of the video display memory for secure data storage that corresponds to the secure display area;
        store invalid data in the reserved portion of the video display memory until a determined period of time before the data stored in the reserved portion is transferred to the video display device for display, the invalid data being an obfuscated form of the valid data; and
        replace the invalid data with valid data at the beginning of the determined period of time.

6. The computer-readable medium of claim 5 wherein the determined period of time corresponds to a time required to deobfuscate the invalid data stored in the reserved portion of the video display memory and transfer the reserved portion to the video display device.

7. The computer-readable medium of claim 5, wherein the video display memory scheduler is further structured to:
    after the data stored in the reserved portion is transferred to the video display, reobfuscate the valid data in the reserved portion of the video display memory.

8. The computer-readable medium of claim 5 wherein the valid data is obfuscated by at least one of encryption of the valid data and a raster operation applied to the valid data and a mask.

9. The computer readable medium of claim 8 wherein the mask is a bitmap comprising at least one of an encryption key, a company logo, a pattern, an advertisement, and a black region.

* * * * *